(12) United States Patent
Cohen et al.

(10) Patent No.: US 9,973,446 B2
(45) Date of Patent: May 15, 2018

(54) REMOTE SHARED SERVER PERIPHERALS OVER AN ETHERNET NETWORK FOR RESOURCE VIRTUALIZATION

(75) Inventors: Ariel Cohen, Cupertino, CA (US); Ashok Krishnamurthi, Saratoga, CA (US); Viswanath Krishnamurthy, Sunnyvale, CA (US); Frank Salzmann, Danville, CA (US); David S. Allison, San Ramon, CA (US); Cheng Tang, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 633 days.

(21) Appl. No.: 12/544,744

(22) Filed: Aug. 20, 2009

(65) Prior Publication Data

US 2013/0138836 A1    May 30, 2013

(51) Int. Cl.
*G06F 15/16*    (2006.01)
*H04L 12/931*   (2013.01)

(52) U.S. Cl.
CPC ................... *H04L 49/351* (2013.01)

(58) Field of Classification Search
CPC ................................................ G06F 9/45558
USPC ................................................ 709/250, 226
See application file for complete search history.

(56) References Cited

U.S. PATENT DOCUMENTS

| | | | |
|---|---|---|---|
| 5,621,913 A | 4/1997 | Tuttle et al. | |
| 5,754,948 A | 5/1998 | Metze | |
| 5,815,675 A | 9/1998 | Steele et al. | |
| 5,898,815 A | 4/1999 | Bluhm et al. | |
| 6,003,112 A | 12/1999 | Tetrick | |
| 6,069,895 A * | 5/2000 | Ayandeh | 370/399 |
| 6,145,028 A | 11/2000 | Shank et al. | |
| 6,157,955 A | 12/2000 | Narad et al. | |
| 6,247,086 B1 | 6/2001 | Allingham | |
| 6,253,334 B1 | 6/2001 | Amdahl et al. | |
| 6,282,647 B1 | 8/2001 | Leung et al. | |
| 6,308,282 B1 | 10/2001 | Huang et al. | |
| 6,314,525 B1 | 11/2001 | Mahalingham et al. | |
| 6,331,983 B1 | 12/2001 | Haggerty et al. | |

(Continued)

FOREIGN PATENT DOCUMENTS

| | | |
|---|---|---|
| CN | 1703016 | 11/2005 |
| CN | 104823409 | 8/2015 |

(Continued)

OTHER PUBLICATIONS

Marshall (Xsigo Systems Launches Company and I/O Virtualization Product, Sep. 15, 2007, vmblog.com, "http://vmblog.com/archive/2007/09/15/xsigo-systems-launches-company-and-i-o-virtualization-product.aspx" accessed on Mar. 24, 20014).*

(Continued)

*Primary Examiner* — Suraj Joshi
*Assistant Examiner* — Sherman Lin
(74) *Attorney, Agent, or Firm* — Kilpatrick Townsend & Stockton LLP

(57) ABSTRACT

Provided is a novel approach for connecting servers to peripherals, such as NICs, HBAs, and SAS/SATA controllers. Also provided are systems for arranging peripherals within one or more I/O directors, which are connected to the servers over an Ethernet network. Such arrangement allows sharing the same resource among multiple servers.

34 Claims, 10 Drawing Sheets

(56) References Cited

U.S. PATENT DOCUMENTS

| | | | |
|---|---|---|---|
| 6,343,324 B1 | 1/2002 | Hubis et al. | |
| 6,377,992 B1 | 4/2002 | Plaza et al. | |
| 6,393,483 B1 | 5/2002 | Latif et al. | |
| 6,401,117 B1 | 6/2002 | Narad et al. | |
| 6,418,494 B1 | 7/2002 | Shatas et al. | |
| 6,430,191 B1 | 8/2002 | Klausmeier et al. | |
| 6,466,993 B1 | 10/2002 | Bonola | |
| 6,470,397 B1 | 10/2002 | Shah et al. | |
| 6,578,128 B1 | 6/2003 | Arsenault et al. | |
| 6,594,329 B1 | 7/2003 | Susnow | |
| 6,628,608 B1 | 9/2003 | Lau et al. | |
| 6,708,297 B1 | 3/2004 | Bassel | |
| 6,725,388 B1 | 4/2004 | Susnow | |
| 6,757,725 B1* | 6/2004 | Frantz et al. | 709/223 |
| 6,779,064 B2 | 8/2004 | McGowen et al. | |
| 6,804,257 B1 | 10/2004 | Benayoun et al. | |
| 6,807,581 B1 | 10/2004 | Starr et al. | |
| 6,823,458 B1 | 11/2004 | Lee et al. | |
| 6,898,670 B2 | 5/2005 | Nahum | |
| 6,931,511 B1 | 8/2005 | Weybrew et al. | |
| 6,937,574 B1 | 8/2005 | Delaney et al. | |
| 6,963,946 B1 | 11/2005 | Dwork et al. | |
| 6,970,921 B1 | 11/2005 | Wang et al. | |
| 7,011,845 B2 | 3/2006 | Kozbor et al. | |
| 7,046,668 B2 | 5/2006 | Pettey et al. | |
| 7,093,265 B1 | 8/2006 | Jantz et al. | |
| 7,096,308 B2 | 8/2006 | Main et al. | |
| 7,103,064 B2 | 9/2006 | Pettey et al. | |
| 7,103,888 B1 | 9/2006 | Clayton et al. | |
| 7,111,084 B2 | 9/2006 | Tan et al. | |
| 7,120,728 B2 | 10/2006 | Krakirian et al. | |
| 7,127,445 B2 | 10/2006 | Mogi et al. | |
| 7,143,227 B2 | 11/2006 | Maine | |
| 7,159,046 B2 | 1/2007 | Mulla et al. | |
| 7,171,434 B2 | 1/2007 | Ibrahim et al. | |
| 7,171,495 B2 | 1/2007 | Matters et al. | |
| 7,181,211 B1* | 2/2007 | Phan-Anh | H04W 8/18 370/252 |
| 7,188,209 B2 | 3/2007 | Pettey et al. | |
| 7,203,842 B2 | 4/2007 | Kean | |
| 7,209,439 B2 | 4/2007 | Rawlins et al. | |
| 7,213,246 B1 | 5/2007 | van Rietschote et al. | |
| 7,219,183 B2 | 5/2007 | Pettey et al. | |
| 7,240,098 B1 | 7/2007 | Mansee | |
| 7,260,661 B2 | 8/2007 | Bury et al. | |
| 7,269,168 B2 | 9/2007 | Roy et al. | |
| 7,281,030 B1 | 10/2007 | Davis | |
| 7,281,077 B2 | 10/2007 | Woodral | |
| 7,281,169 B2 | 10/2007 | Golasky et al. | |
| 7,307,948 B2 | 12/2007 | Infante et al. | |
| 7,308,551 B2 | 12/2007 | Arndt et al. | |
| 7,334,178 B1 | 2/2008 | Aulagnier | |
| 7,345,689 B2 | 3/2008 | Janus et al. | |
| 7,346,716 B2 | 3/2008 | Bogin et al. | |
| 7,360,017 B2 | 4/2008 | Higaki et al. | |
| 7,366,842 B1 | 4/2008 | Acocella et al. | |
| 7,386,637 B2 | 6/2008 | Arndt et al. | |
| 7,395,352 B1 | 7/2008 | Lam et al. | |
| 7,412,536 B2 | 8/2008 | Oliver et al. | |
| 7,421,710 B2 | 9/2008 | Qi et al. | |
| 7,424,529 B2 | 9/2008 | Hubis | |
| 7,433,300 B1 | 10/2008 | Bennett et al. | |
| 7,457,897 B1 | 11/2008 | Lee et al. | |
| 7,457,906 B2 | 11/2008 | Pettey et al. | |
| 7,493,416 B2 | 2/2009 | Pettey | |
| 7,502,884 B1* | 3/2009 | Shah | H04L 67/1097 370/395.21 |
| 7,509,436 B1 | 3/2009 | Rissmeyer | |
| 7,516,252 B2 | 4/2009 | Krithivas | |
| 7,602,774 B1 | 10/2009 | Sundaresan et al. | |
| 7,606,260 B2 | 10/2009 | Oguchi et al. | |
| 7,609,723 B2 | 10/2009 | Munguia | |
| 7,634,650 B1 | 12/2009 | Shah et al. | |
| 7,669,000 B2 | 2/2010 | Sharma et al. | |
| 7,711,789 B1 | 5/2010 | Jnagal et al. | |
| 7,733,890 B1 | 6/2010 | Droux et al. | |
| 7,782,869 B1 | 8/2010 | Chitlur Srinivasa | |
| 7,783,788 B1 | 8/2010 | Quinn et al. | |
| 7,792,923 B2 | 9/2010 | Kim | |
| 7,793,298 B2 | 9/2010 | Billau et al. | |
| 7,821,973 B2 | 10/2010 | McGee et al. | |
| 7,836,332 B2 | 11/2010 | Hara et al. | |
| 7,843,907 B1 | 11/2010 | Abou-Emara et al. | |
| 7,849,153 B2 | 12/2010 | Kim | |
| 7,865,626 B2 | 1/2011 | Hubis | |
| 7,870,225 B2 | 1/2011 | Kim | |
| 7,899,928 B1 | 3/2011 | Naik et al. | |
| 7,933,993 B1 | 4/2011 | Skinner | |
| 7,937,447 B1 | 5/2011 | Cohen et al. | |
| 7,941,814 B1 | 5/2011 | Okcu et al. | |
| 8,041,875 B1 | 10/2011 | Shah et al. | |
| 8,180,872 B1 | 5/2012 | Marinelli et al. | |
| 8,180,949 B1 | 5/2012 | Shah et al. | |
| 8,185,664 B1 | 5/2012 | Lok et al. | |
| 8,195,854 B1 | 6/2012 | Sihare | |
| 8,200,871 B2 | 6/2012 | Rangan et al. | |
| 8,218,538 B1 | 7/2012 | Chidambaram et al. | |
| 8,228,820 B2 | 7/2012 | Gopal Gowda et al. | |
| 8,261,068 B1 | 9/2012 | Raizen et al. | |
| 8,285,907 B2 | 10/2012 | Chappell et al. | |
| 8,291,148 B1 | 10/2012 | Shah et al. | |
| 8,387,044 B2 | 2/2013 | Yamada et al. | |
| 8,392,645 B2 | 3/2013 | Miyoshi | |
| 8,397,092 B2 | 3/2013 | Karnowski | |
| 8,443,119 B1 | 5/2013 | Limaye et al. | |
| 8,458,306 B1 | 6/2013 | Sripathi | |
| 8,677,023 B2 | 3/2014 | Venkataraghavan et al. | |
| 8,892,706 B1 | 11/2014 | Dalal | |
| 9,064,058 B2 | 6/2015 | Daniel | |
| 9,083,550 B2 | 7/2015 | Cohen et al. | |
| 9,264,384 B1 | 2/2016 | Sundaresan et al. | |
| 9,331,963 B2 | 5/2016 | Krishnamurthi et al. | |
| 2001/0032280 A1 | 10/2001 | Osakada et al. | |
| 2001/0037406 A1 | 11/2001 | Philbrick et al. | |
| 2002/0023151 A1 | 2/2002 | Iwatani | |
| 2002/0065984 A1 | 5/2002 | Thompson et al. | |
| 2002/0069245 A1 | 6/2002 | Kim | |
| 2002/0146448 A1 | 10/2002 | Kozbor et al. | |
| 2002/0152327 A1 | 10/2002 | Kagan et al. | |
| 2003/0007505 A1* | 1/2003 | Noda et al. | 370/467 |
| 2003/0028716 A1 | 2/2003 | Sved | |
| 2003/0037177 A1* | 2/2003 | Sutton et al. | 709/316 |
| 2003/0051076 A1 | 3/2003 | Webber | |
| 2003/0081612 A1* | 5/2003 | Goetzinger et al. | 370/395.21 |
| 2003/0093501 A1 | 5/2003 | Carlson et al. | |
| 2003/0099254 A1 | 5/2003 | Richter | |
| 2003/0110364 A1* | 6/2003 | Tang et al. | 711/168 |
| 2003/0118053 A1 | 6/2003 | Edsall et al. | |
| 2003/0126315 A1 | 7/2003 | Tan et al. | |
| 2003/0126320 A1 | 7/2003 | Liu et al. | |
| 2003/0126344 A1 | 7/2003 | Hodapp, Jr. | |
| 2003/0131182 A1 | 7/2003 | Kumar et al. | |
| 2003/0165140 A1 | 9/2003 | Tang et al. | |
| 2003/0172149 A1 | 9/2003 | Edsall et al. | |
| 2003/0200315 A1 | 10/2003 | Goldenberg et al. | |
| 2003/0200363 A1 | 10/2003 | Futral et al. | |
| 2003/0208614 A1 | 11/2003 | Wilkes | |
| 2003/0212755 A1 | 11/2003 | Shatas et al. | |
| 2003/0226018 A1 | 12/2003 | Tardo et al. | |
| 2003/0229645 A1 | 12/2003 | Mogi et al. | |
| 2004/0003140 A1 | 1/2004 | Rimmer | |
| 2004/0003141 A1 | 1/2004 | Matters et al. | |
| 2004/0003154 A1 | 1/2004 | Harris et al. | |
| 2004/0008713 A1 | 1/2004 | Knight et al. | |
| 2004/0025166 A1 | 2/2004 | Adlung et al. | |
| 2004/0028063 A1 | 2/2004 | Roy et al. | |
| 2004/0030857 A1 | 2/2004 | Krakirian et al. | |
| 2004/0034718 A1 | 2/2004 | Goldenberg et al. | |
| 2004/0054776 A1 | 3/2004 | Klotz et al. | |
| 2004/0057441 A1* | 3/2004 | Li et al. | 370/401 |
| 2004/0064590 A1 | 4/2004 | Starr et al. | |
| 2004/0078632 A1 | 4/2004 | Infante et al. | |
| 2004/0081145 A1 | 4/2004 | Harrekilde-Petersen et al. | |
| 2004/0107300 A1 | 6/2004 | Padmanabhan et al. | |

(56) References Cited

U.S. PATENT DOCUMENTS

| | | | |
|---|---|---|---|
| 2004/0123013 A1 | 6/2004 | Clayton et al. | |
| 2004/0139237 A1 | 7/2004 | Rangan et al. | |
| 2004/0151188 A1 | 8/2004 | Maveli et al. | |
| 2004/0160970 A1 | 8/2004 | Dally et al. | |
| 2004/0172494 A1 | 9/2004 | Pettey et al. | |
| 2004/0179529 A1 | 9/2004 | Pettey et al. | |
| 2004/0210623 A1 | 10/2004 | Hydrie et al. | |
| 2004/0218579 A1 | 11/2004 | An | |
| 2004/0225719 A1* | 11/2004 | Kisley et al. | 709/212 |
| 2004/0225764 A1 | 11/2004 | Pooni et al. | |
| 2004/0233933 A1 | 11/2004 | Munguia | |
| 2004/0236877 A1 | 11/2004 | Burton | |
| 2005/0010688 A1 | 1/2005 | Murakami et al. | |
| 2005/0033878 A1 | 2/2005 | Pangal et al. | |
| 2005/0039063 A1 | 2/2005 | Hsu et al. | |
| 2005/0044301 A1 | 2/2005 | Vasilevsky et al. | |
| 2005/0050191 A1 | 3/2005 | Hubis | |
| 2005/0058085 A1 | 3/2005 | Shapiro et al. | |
| 2005/0066045 A1 | 3/2005 | Johnson et al. | |
| 2005/0080923 A1 | 4/2005 | Elzur | |
| 2005/0080982 A1 | 4/2005 | Vasilevsky et al. | |
| 2005/0091441 A1 | 4/2005 | Qi et al. | |
| 2005/0108407 A1 | 5/2005 | Johnson et al. | |
| 2005/0111483 A1 | 5/2005 | Cripe et al. | |
| 2005/0114569 A1 | 5/2005 | Bogin et al. | |
| 2005/0114595 A1 | 5/2005 | Karr et al. | |
| 2005/0120160 A1* | 6/2005 | Plouffe et al. | 711/1 |
| 2005/0141425 A1 | 6/2005 | Foulds | |
| 2005/0160251 A1 | 7/2005 | Zur et al. | |
| 2005/0182853 A1 | 8/2005 | Lewites et al. | |
| 2005/0188239 A1 | 8/2005 | Golasky et al. | |
| 2005/0198410 A1 | 9/2005 | Kagan et al. | |
| 2005/0198523 A1 | 9/2005 | Shanbhag et al. | |
| 2005/0203908 A1 | 9/2005 | Lam et al. | |
| 2005/0232285 A1 | 10/2005 | Terrell et al. | |
| 2005/0238035 A1 | 10/2005 | Riley | |
| 2005/0240621 A1 | 10/2005 | Robertson et al. | |
| 2005/0240932 A1 | 10/2005 | Billau et al. | |
| 2005/0262269 A1 | 11/2005 | Pike | |
| 2006/0004983 A1 | 1/2006 | Tsao et al. | |
| 2006/0007937 A1 | 1/2006 | Sharma | |
| 2006/0010287 A1 | 1/2006 | Kim | |
| 2006/0013240 A1 | 1/2006 | Ma et al. | |
| 2006/0045089 A1* | 3/2006 | Bacher | H04L 12/4641 370/392 |
| 2006/0045098 A1 | 3/2006 | Krause | |
| 2006/0050693 A1 | 3/2006 | Bury et al. | |
| 2006/0059400 A1 | 3/2006 | Clark et al. | |
| 2006/0092928 A1 | 5/2006 | Pike et al. | |
| 2006/0129699 A1 | 6/2006 | Kagan et al. | |
| 2006/0136570 A1 | 6/2006 | Pandya | |
| 2006/0168286 A1 | 7/2006 | Makhervaks et al. | |
| 2006/0168306 A1 | 7/2006 | Makhervaks et al. | |
| 2006/0179178 A1 | 8/2006 | King | |
| 2006/0182034 A1 | 8/2006 | Klinker et al. | |
| 2006/0184711 A1 | 8/2006 | Pettey et al. | |
| 2006/0193327 A1 | 8/2006 | Arndt et al. | |
| 2006/0200584 A1 | 9/2006 | Bhat | |
| 2006/0212608 A1 | 9/2006 | Arndt et al. | |
| 2006/0224843 A1 | 10/2006 | Rao et al. | |
| 2006/0233168 A1 | 10/2006 | Lewites et al. | |
| 2006/0242332 A1 | 10/2006 | Johnsen et al. | |
| 2006/0253619 A1 | 11/2006 | Torudbakken et al. | |
| 2006/0282591 A1 | 12/2006 | Krithivas | |
| 2006/0292292 A1 | 12/2006 | Brightman et al. | |
| 2007/0011358 A1 | 1/2007 | Wiegert et al. | |
| 2007/0050520 A1 | 3/2007 | Riley | |
| 2007/0067435 A1 | 3/2007 | Landis et al. | |
| 2007/0101173 A1 | 5/2007 | Fung | |
| 2007/0112574 A1 | 5/2007 | Greene | |
| 2007/0112963 A1 | 5/2007 | Dykes et al. | |
| 2007/0130295 A1 | 6/2007 | Rastogi et al. | |
| 2007/0220170 A1 | 9/2007 | Abjanic et al. | |
| 2007/0286233 A1 | 12/2007 | Latif et al. | |
| 2008/0025217 A1* | 1/2008 | Gusat et al. | 370/232 |
| 2008/0082696 A1* | 4/2008 | Bestler | 709/250 |
| 2008/0159260 A1 | 7/2008 | Vobbilisetty et al. | 370/351 |
| 2008/0192648 A1* | 8/2008 | Galles | 370/254 |
| 2008/0205409 A1 | 8/2008 | McGee et al. | |
| 2008/0225877 A1 | 9/2008 | Yoshida | |
| 2008/0270726 A1 | 10/2008 | Elnozahy et al. | |
| 2008/0288627 A1 | 11/2008 | Hubis | |
| 2008/0301692 A1 | 12/2008 | Billau et al. | |
| 2008/0307150 A1 | 12/2008 | Stewart et al. | |
| 2009/0070422 A1 | 3/2009 | Kashyap et al. | |
| 2009/0106470 A1 | 4/2009 | Sharma et al. | |
| 2009/0141728 A1 | 6/2009 | Brown et al. | |
| 2009/0296579 A1* | 12/2009 | Dharwadkar | H04L 12/4641 370/235 |
| 2009/0307388 A1 | 12/2009 | Tchapda | |
| 2010/0010899 A1* | 1/2010 | Lambert | G06Q 30/02 705/14.58 |
| 2010/0088432 A1 | 4/2010 | Itoh | |
| 2010/0138602 A1 | 6/2010 | Kim | |
| 2010/0195549 A1 | 8/2010 | Aragon et al. | |
| 2010/0232450 A1 | 9/2010 | Maveli et al. | |
| 2010/0293552 A1 | 11/2010 | Allen et al. | |
| 2011/0153715 A1 | 6/2011 | Oshins et al. | |
| 2011/0154318 A1 | 6/2011 | Oshins et al. | |
| 2012/0072564 A1 | 3/2012 | Johnsen | |
| 2012/0079143 A1 | 3/2012 | Krishnamurthi et al. | |
| 2012/0110385 A1 | 5/2012 | Fleming et al. | |
| 2012/0144006 A1 | 6/2012 | Wakamatsu et al. | |
| 2012/0158647 A1 | 6/2012 | Yadappanavar et al. | |
| 2012/0163376 A1 | 6/2012 | Shukla et al. | |
| 2012/0163391 A1 | 6/2012 | Shukla et al. | |
| 2012/0166575 A1 | 6/2012 | Ogawa et al. | |
| 2012/0167080 A1 | 6/2012 | Vilayannur et al. | |
| 2012/0209905 A1 | 8/2012 | Haugh et al. | |
| 2012/0239789 A1 | 9/2012 | Ando et al. | |
| 2012/0304168 A1 | 11/2012 | Raj Seeniraj et al. | |
| 2013/0031200 A1 | 1/2013 | Gulati et al. | |
| 2013/0080610 A1 | 3/2013 | Ando | |
| 2013/0117421 A1 | 5/2013 | Wimmer | |
| 2013/0117485 A1 | 5/2013 | Varchavtchik et al. | |
| 2013/0138758 A1 | 5/2013 | Cohen et al. | |
| 2013/0145072 A1 | 6/2013 | Venkataraghavan et al. | |
| 2013/0159637 A1 | 6/2013 | Forgette et al. | |
| 2013/0179532 A1 | 7/2013 | Tameshige et al. | |
| 2013/0201988 A1 | 8/2013 | Zhou et al. | |
| 2014/0122675 A1 | 5/2014 | Cohen et al. | |
| 2015/0134854 A1 | 5/2015 | Tchapda | |

FOREIGN PATENT DOCUMENTS

| | | |
|---|---|---|
| EP | 2912805 | 9/2015 |
| EP | 2912805 | 6/2016 |
| EP | 2912805 | 5/2017 |
| WO | 2014070445 | 5/2014 |

OTHER PUBLICATIONS

Figueiredo et al, "Resource Virtualization Renaissance", May 2005, IEEE Computer Society, pp. 28-31.

Ajay V. Bhatt, "Creating a Third Generation I/O Interconnect", Intel® Developer Network for PCI Express* Architecture, www.express-lane.org, pp. 1-11.

U.S. Application Entitled "Resource Virtualization Switch" U.S. Appl. No. 11/179,085, filed Jul. 11, 2005.

U.S. Office Action for U.S. Appl. No. 11/179,085 dated May 31, 2007.

U.S. Final Office Action for U.S. Appl. No. 11/179,085 dated Oct. 30, 2007.

U.S. Notice of Allowance for U.S. Appl. No. 11/179,085 dated Aug. 11, 2008.

U.S. Continuation Application Entitled "Resource Virtualization Switch" filed Oct. 14, 2008, U.S. Appl. No. 12/250,842.

U.S. Office Action for U.S. Appl. No. 11/200,761 dated Mar. 12, 2009.

U.S. Final Office Action for U.S. Appl. No. 11/200,761 dated Aug. 13, 2009.

(56) References Cited

OTHER PUBLICATIONS

U.S. Application entitled "Quality of Service for Server Applications", U.S. Appl. No. 11/179,437, filed Jul. 11, 2005.
U.S. Office Action for U.S. Appl. No. 11/179,437 dated May 8, 2008.
U.S. Final Office Action for U.S. Appl. No. 11/179,437 dated Jan. 8, 2009.
U.S. Notice of Allowance for U.S. Appl. No. 11/179,437 dated Jun. 1, 2009.
U.S. Application entitled "Efficient Data Transfer Between Servers and Remote Peripherals", U.S. Appl. No. 11/200,761, filed Aug. 9, 2009.
U.S. Appl. No. 11/083,258, Non-Final Office Action, dated Sep. 18, 2013, 35 pages.
U.S. Appl. No. 11/145,698, Notice of Allowance, dated Oct. 24, 2013, 15 pages.
U.S. Appl. No. 11/200,761 Final Office Action dated Jan. 9, 2014, 23 pages.
Wikipedia's article on 'Infiniband', Aug. 2010.
U.S. Appl. No. 11/083,258, Final Office Action dated Feb. 2, 2009, 13 pages.
U.S. Appl. No. 11/083,258, Final Office Action dated Jun. 10, 2010, 15 pages.
U.S. Appl. No. 11/083,258, Final Office Action dated Oct. 26, 2012, 30 pages.
U.S. Appl. No. 11/083,258, Non-Final Office Action dated Jul. 11, 2008, 12 pages.
U.S. Appl. No. 11/083,258, Non-Final Office Action dated Nov. 12, 2009, 13 pages.
U.S. Appl. No. 11/083,258, Non-Final Office Action dated Mar. 28, 2011, 14 pages.
U.S. Appl. No. 11/083,258, Non-Final Office Action dated Apr. 25, 2012, 30 pages.
U.S. Appl. No. 11/086,117, Final Office Action dated Dec. 23, 2008, 11 pages.
U.S. Appl. No. 11/086,117, Final Office Action dated Dec. 10, 2009, 18 pages.
U.S. Appl. No. 11/086,117, Non-Final Office Action dated May 6, 2009, 12 pages.
U.S. Appl. No. 11/086,117, Non-Final Office Action dated Jul. 22, 2008, 13 pages.
U.S. Appl. No. 11/086,117, Non-Final Office Action dated Jul. 22, 2010, 24 pages.
U.S. Appl. No. 11/086,117, Notice of Allowance dated Dec. 27, 2010, 15 pages.
U.S. Appl. No. 11/145,698, Final Office Action dated Aug. 18, 2009, 22 pages.
U.S. Appl. No. 11/145,698, Final Office Action dated Jul. 6, 2011, 26 pages.
U.S. Appl. No. 11/145,698, Non-Final Office Action dated May 9, 2013, 13 pages.
U.S. Appl. No. 11/145,698, Non-Final Office Action dated Mar. 31, 2009, 22 pages.
U.S. Appl. No. 11/145,698, Non-Final Office Action dated Mar. 16, 2011, 24 pages.
U.S. Appl. No. 11/179,085, Pre Appeal Brief Request mailed on Jan. 24, 2008, 6 pages.
U.S. Appl. No. 11/179,085, Preliminary Amendment dated May 27, 2008, 9 pages.
U.S. Appl. No. 11/179,085, Response to Non-final Office Action dated Aug. 10, 2007, 8 pages.
U.S. Appl. No. 11/184,306, Notice of Allowance dated Aug. 10, 2009, 4 pages.
U.S. Appl. No. 11/200,761, Final Office Action dated Jul. 9, 2010, 22 pages.
U.S. Appl. No. 11/200,761, Non-Final Office Action dated Jun. 11, 2013, 21 pages.
U.S. Appl. No. 11/200,761, Non-Final Office Action dated Aug. 31, 2012, 21 pages.
U.S. Appl. No. 11/200,761, Non-Final Office Action dated Jan. 20, 2010, 22 pages.
U.S. Appl. No. 11/200,761, Office Action dated Feb. 7, 2013, 22 pages.
U.S. Appl. No. 11/222,590, Non-Final Office Action dated Mar. 21, 2007, 6 pages.
U.S. Appl. No. 11/222,590, Notice of Allowance dated Sep. 18, 2007, 5 pages.
U.S. Appl. No. 12/250,842, Allowed Claims mailed on Jun. 10, 2011.
U.S. Appl. No. 12/250,842, Non-Final Office Action dated Aug. 10, 2010, 9 pages.
U.S. Appl. No. 12/250,842, Notice of Allowance dated Feb. 18, 2011, 5 pages.
U.S. Appl. No. 12/250,842, Notice of Allowance dated Jun. 10, 2011, 5 pages.
U.S. Appl. No. 12/250,842, Response to Non-Final Office Action filed on Nov. 19, 2010, 8 pages.
U.S. Appl. No. 12/862,977, Non-Final Office Action dated Mar. 1, 2012, 8 pages.
U.S. Appl. No. 12/862,977, Non-Final Office Action dated Aug. 29, 2012, 9 pages.
U.S. Appl. No. 12/862,977, Notice of Allowance dated Feb. 7, 2013, 11 pages.
U.S. Appl. No. 12/890,498, Non-Final Office Action dated Nov. 13, 2011, 10 pages.
U.S. Appl. No. 12/890,498, Non-Final Office Action dated May 21, 2013, 22 pages.
U.S. Appl. No. 13/229,587, Non-Final Office Action dated Oct. 6, 2011, 4 pages.
U.S. Appl. No. 13/229,587, Notice of Allowance dated Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance dated Jun. 20, 2012, 5 pages.
Kesavan et al., Active CoordinaTion (ACT)—Toward Effectively Managing Virtualized Multicore Clouds, IEEE, 2008.
Liu et al., High Performance RDMA-Based MPI Implementation over InfiniBand, ICS'03, San Francisco, ACM, Jun. 23-26, 2003, 10 pages.
Poulton, Xsigo—Try it out, I dare you, Nov. 16, 2009.
Ranadive et al., IBMon: Monitoring VMM—Bypass Capable InfiniBand Devices using Memory Introspection, ACM, 2009.
Wong et al., Effective Generation of Test Sequences for Structural Testing of Concurrent Programs, IEEE International Conference of Complex Computer Systems (ICECCS'05), 2005.
Xu et al., Performance Virtualization for Large-Scale Storage Systems, IEEE, 2003, 10 pages.
U.S. Appl. No. 11/179,085, Non-Final Office Action dated May 31, 2007, 14 pages.
U.S. Appl. No. 11/179,085, Final Office Action dated Oct. 30, 2007, 13 pages.
U.S. Appl. No. 11/179,085, Notice of Allowance dated Aug. 11, 2008, 4 pages.
U.S. Appl. No. 11/083,258, Advisory Action dated Jan. 24, 2013, 3 pages.
U.S. Appl. No. 11/179,437, Notice of Allowance dated Jun. 1, 2009, 8 pages.
U.S. Appl. No. 11/179,437, Final Office Action dated Jan. 8, 2009, 13 pages.
U.S. Appl. No. 11/179,437, Non-Final Office Action dated May 8, 2008, 11 pages.
U.S. Appl. No. 11/179,437, filed Jul. 11, 2005.
U.S. Appl. No. 12/890,498, Final Office Action dated Feb. 7, 2012, 9 Pages.
International Search Report and written Opinion of PCT/US2013/065008 dated Apr. 16, 2014, 17 pages.
U.S. Appl. No. 11/083,258, filed Mar. 16, 2005, Final Office Action dated Apr. 18, 2014, 37 pages.
U.S. Appl. No. 11/184,306, Non-Final Office Action dated Apr. 10, 2009, 5 pages.

(56) References Cited

OTHER PUBLICATIONS

U.S. Appl. No. 11/083,258, Final Office Action dated Mar. 19, 2015, 37 pages.
U.S. Appl. No. 13/663,405, Notice of Allowance dated Mar. 12, 2015, 13 pages.
HTTP Persistent Connection Establishment, Management and Termination, section of 'The TCP/IP Guide' version 3.0, Sep. 20, 2005, 2 pages.
TCP Segment Retransmission Timers and the Retransmission Queue, section of 'The TCP/IP Guide' version 3.0, Sep. 20, 2005, 3 pages.
TCP Window Size Adjustment and Flow Control, section of 'The TCP/IP Guide' version 3.0, Sep. 20, 2005, 2 pages.
Balakrishnan et al., Improving TCP/IP Performance over Wireless Networks, Proc. 1st ACM Int'l Conf. on Mobile Computing and Networking (Mobicom), Nov. 1995, 10 pages.
U.S. Appl. No. 12/890,498, Final Office Action dated Jun. 17, 2015, 24 pages.
U.S. Appl. No. 11/200,761, Non-Final Office Action dated Mar. 11, 2015, 24 pages.
U.S. Appl. No. 12/890,498, Advisory Action dated Jan. 27, 2015, 3 pages.
U.S. Appl. No. 12/890,498, Final Office Action dated Nov. 19, 2014, 21 pages.
U.S. Appl. No. 12/890,498, Non-Final Office Action dated Mar. 5, 2015, 24 pages.
U.S. Appl. No. 13/663,405, Non-Final Office Action dated Nov. 21, 2014, 19 pages.
Spanbauer, Wired or Wireless, Choose Your Network, PCWorld, Sep. 30, 2003, 9 pages.
U.S. Appl. No. 11/083,258, Non-Final Office Action dated Sep. 10, 2014, 34 pages.
U.S. Appl. No. 11/200,761, Advisory Action dated Oct. 21, 2009, 2 pages.
U.S. Appl. No. 11/200,761, Advisory Action dated Apr. 19, 2013, 3 pages.
U.S. Appl. No. 11/200,761, Advisory Action dated Aug. 31, 2010, 3 pages.
U.S. Appl. No. 12/890,498, Advisory Action dated Apr. 16, 2012, 4 pages.
U.S. Appl. No. 12/890,498, Notice of Allowance dated Dec. 30, 2015, all pages.
U.S. Appl. No. 12/890,498, Advisory Action dated Aug. 25, 2015, 3 pages.
U.S. Appl. No. 11/083,258, Corrected Notice of Allowability dated Oct. 15, 2015, 5 pages.
U.S. Appl. No. 11/083,258, Notice of Allowance dated Oct. 5, 2015, 8 pages.
U.S. Appl. No. 11/200,761, Final Office Action dated Oct. 22, 2015, 22 pages.
European Application No. 13850840.3, Extended European Search Report dated May 3, 2016, 6 pages.
International Application No. PCT/US2013/065008, International Preliminary Report on Patentability dated May 14, 2015, 6 pages.
U.S. Appl. No. 12/890,498, Supplemental Notice of Allowability dated Jan. 14, 2016, 2 pages.
U.S. Appl. No. 11/200,761 , "Non-Final Office Action", dated Jul. 27, 2016, 21 pages.
U.S. Appl. No. 11/200,761, filed Aug. 9, 2017 received a Notice of Allowance dated Jun. 23, 2017, all pages.
Chinese Application No. 201380063351.0, Office Action dated May 2, 2017, 16 pages (7 pages for the original document and 9 pages for the English translation).
U.S. Appl. No. 11/200,761, Final Office Action dated Feb. 9, 2017, 7 pages.
Notice of Decision to Grant dated Dec. 15, 2016 in European Patent Application No. 13850840.3.

* cited by examiner

REMOTE SHARED SERVER PERIPHERALS OVER AN ETHERNET NETWORK FOR RESOURCE VIRTUALIZATION

OVERVIEW

A server or computing system generally includes one or more processors, memory, and peripheral components and peripheral interfaces. Examples of peripheral components include cryptographic accelerators, graphics accelerators, and extensible markup language (XML) accelerators. Examples of peripheral interfaces include network interface cards (NICs), serial ATA (SATA) adapters, serial attached SCSI (SAS) adapters, RAID adapters, and Fibre Channel and iSCSI host bus adapters (HBAs). Processors, memory, and peripherals are often connected using one or more buses and bus bridges. To provide fault-tolerance, individual servers are often configured with redundant resources.

Since resources, such as peripheral components and peripheral interfaces, are assigned on a per server basis, other servers do not typically have access to these resources. In order to provide adequate resources for each server, resources are typically over-provisioned. For example, more hardware acceleration is provided than is typically needed. More network interface capacity is allocated than is typically used simply to handle worst-case or expected worst-case scenarios. Resources are over-provisioned resulting in overall waste and low utilization. Resource assignment on a per server basis also limits the ability to reconstruct or reconfigure a resource environment.

A more efficient and flexible approach is to provide remote peripherals which can be shared among servers while maintaining quality-of-service guarantees and providing the ability to change dynamically the assignment of peripherals to servers. Such shared remote peripherals are referred to as virtualized resources.

Ethernet is a commonly deployed server networking technology and it may be used for communication between servers and their remote peripherals. However, the high reliability, performance, and quality-of-service guarantees needed for communication with remote peripherals are lacking for known Ethernet applications. Consequently, the techniques and mechanisms are needed to provide efficient and reliable data transfer between servers and remote peripherals over Ethernet, along with quality of service and methods to discover and manage the remote peripherals.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF EXAMPLE EMBODIMENTS

Figure 1:
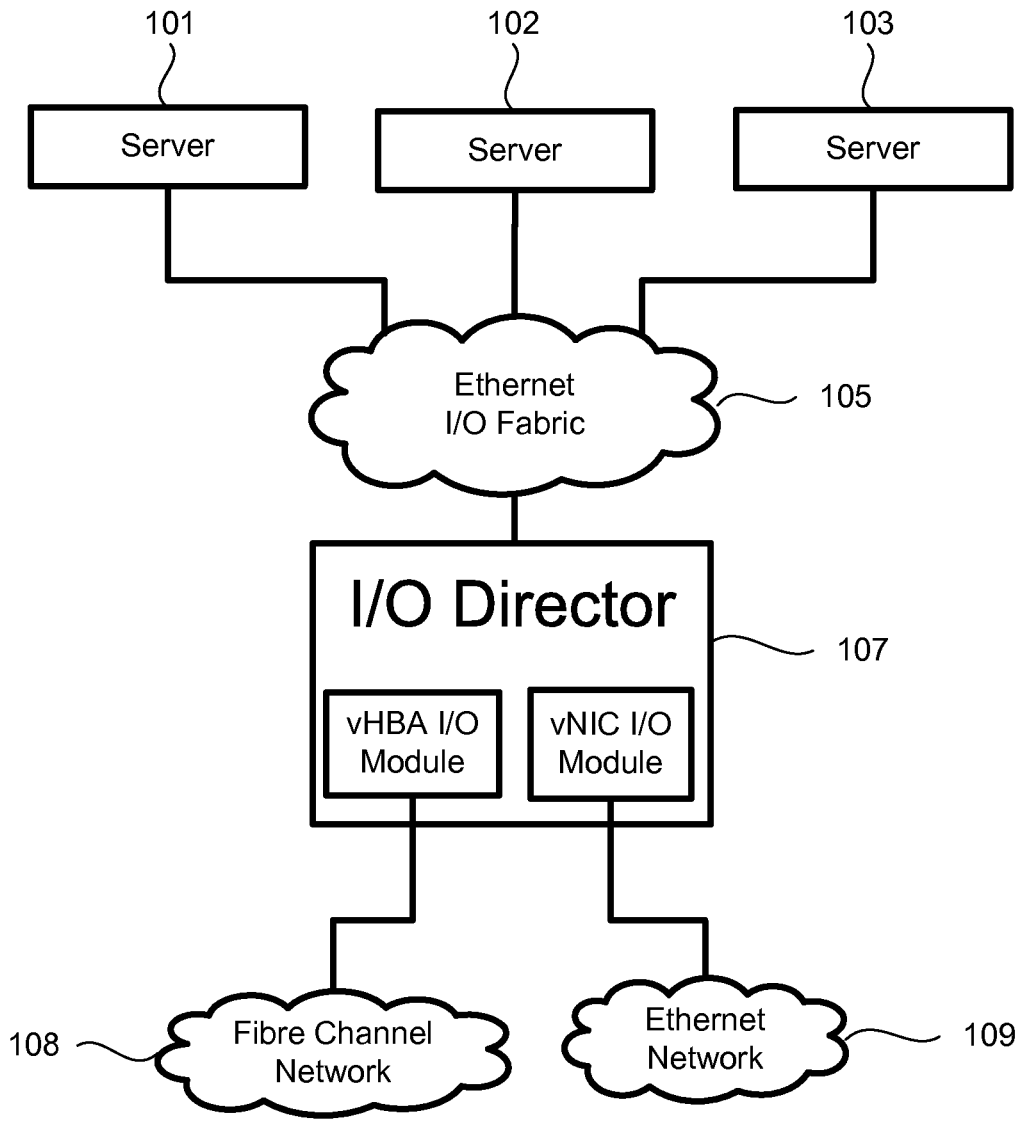
FIG. 1 is a diagrammatic representation showing multiple servers having virtualized resources interconnected with an I/O director using an Ethernet fabric.

Reference will now be made in detail to some specific examples of the invention including the best modes contemplated for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of lossy and lossless Ethernet and Fibre Channel Storage Area Networks (SANs). However, it should be noted that the techniques of the present invention can be applied to a variety of different standards and variations of Ethernet and SANs. In the following description, numerous specific details are set forth in order to provide a thorough understanding of the present invention. The present invention may be practiced without some or all of these specific details. In other instances, well-known operations have not been described in detail in order not to obscure unnecessarily the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A server or computing system generally includes one or more processors, memory, as well as other peripheral components and peripheral interfaces, such as HBAs, hardware accelerators, NICs, graphics accelerators, disks, etc. Applications running on servers can access storage within a SAN using resources such as HBAs, while other networks are accessed using NICs.

Servers using conventional internal dedicated I/O controllers are typically over-provisioned with NICs and HBAs due to many reasons. One reason is a need to provide sufficient capacity for the occasional peak loads incurred by the server. Another reason is the need to connect the server to multiple networks, each requiring its own I/O adapter port. Furthermore, there may be a need to provide dedicated bandwidth to different applications. For example, servers are increasingly virtualized to run multiple operating systems in different virtual machines on the same server at the same time. These reasons may lead to multiple I/O controllers installed on virtualized servers. Over-provisioning resources increases the cost and complexity of servers (e.g., servers with many bus slots to accommodate various adapters), increases the number of edge switch ports to connect to the adapters, and leads to extensive cabling.

Consequently, the techniques and mechanisms described here provide I/O resources such as NICs, HBAs, and other peripheral interfaces in one or more I/O director devices connected to servers over an Ethernet network. Individual servers no longer each require numerous HBAs and NICs, but instead can share HBAs and NICs provided at an I/O director. The individual servers are connected to the I/O director over an Ethernet network, which is used as an I/O fabric. In this configuration, I/O resources can now be shared across the entire server pool rather than being dedicated to individual servers. Quality of service of I/O for individual servers is provided by the I/O director. As a result, fewer I/O resources are required across multiple servers leading to less complex and less expensive systems. Furthermore, such configurations tend to be more flexible and easier to manage since I/O resources can be assigned dynamically without having to change the physical configurations of the servers (e.g., install or remove I/O adapters).

The techniques and mechanisms of the present invention provide virtual HBAs and virtual NICs that a server can access as though physical HBAs and NICs were included in the server and connected to its I/O bus. In certain embodiments, the actual HBAs and NICs are included in a remote shared I/O module within an I/O director connected to the server over an Ethernet network. I/O buses provide reliable ordered delivery with flow control, which is important for communication with some I/O devices. For example, if some of the traffic between the server and an HBA is lost or delivered out-of-order, storage corruption may occur. Similarly, communication between the server and its vNICs and vHBAs provided by the I/O director must have the same properties of reliability, in-order delivery, and flow control. The techniques and mechanisms of various embodiments address this requirement for both standard (lossy) and lossless Ethernet.

Connecting servers to I/O directors using Ethernet allows for widespread adoption of I/O directors with minimal investment and no disruption. For example, Ethernet cards are readily available on numerous existing servers, and existing servers can be connected to I/O directors using these existing Ethernet interface cards. No additional interfaces or interface cards need to be configured or installed on individual servers, so servers can be used as-is without a need to disrupt their activity, open them, and install new cards. Using these existing Ethernet cards, servers can access and share HBAs, NICs and other peripheral interfaces and components included at an I/O director over an Ethernet network.

FIG. 1 is a diagrammatic representation showing multiple servers 101-103 having virtualized resources interconnected with an IOD 107 using an Ethernet I/O fabric 105. According to various embodiments, the servers 101-103 include NICs in order to connect to the Ethernet I/O fabric 105, processors, and memory. The IOD 107 may include an Ethernet switch in order to connect to the servers 101-103 over the Ethernet fabric. The Ethernet switch may be a lossless Ethernet switch or a lossy Ethernet switch. It may be a stand-alone entity, or provided with the IOD 107. Additional details of the IOD 107 are described in the context of FIGS. 2-4 below.

According to various embodiments, NICs, HBAs and other server I/O resources can be offloaded to the IOD 107. The NICs and HBAs are maintained in a shared and virtualized manner on the IOD 107, which provides links to various external switches. By using the IOD 107, the number of resources and links can be significantly reduced, thus increasing operational efficiencies. Further, the network illustrated in FIG. 1 provides certain degrees of flexibility. For example, the number and types of I/O resources allocated to servers is flexible. Connectivity of servers to external Ethernet and Fibre Channel networks becomes flexible as well, e.g., servers can be connected to different physical networks at different times as needed.

Lossy Ethernet refers to an Ethernet technology in which data packets may be lost or delivered out of order by the Ethernet fabric. Lossless Ethernet refers to an enhanced Ethernet technology, which is also known as Data Center Ethernet (DCE), Convergence Enhanced Ethernet (CEE), or Data Center Bridging (DCB). Lossless Ethernet provides guaranteed packet delivery without drops. It also provides ordered packet delivery, flow control for eight classes of traffic, and some other enhancements, such as congestion management.

According to various embodiments, the IOD 107 can use lossy and/or lossless Ethernet to manage data transfer between the servers 101-103 and the IOD. While lossless Ethernet may be more particularly suitable, other fabrics may be used. For example, a transport protocol used by the IOD 107 may have capabilities for re-transmission, re-ordering out of order packets, back-off upon packet loss for dealing with the lack of flow control, and other capabilities for addressing problems that may arise when using lossy Ethernet. Certain transport protocols may be used on both lossless and lossy Ethernet and furthermore optimized for each Ethernet type. Overall, the transport protocols and IOD configurations of the present invention can be implemented over a lossy or lossless Ethernet fabric.

A number of different transport protocols can be used for communication between the servers and the remote virtual I/O devices provided by the I/O modules within the IOD 107. One example of such a transport protocol is the Internet Wide Area RDMA Protocol (iWARP) which runs on top of TCP. Another example is the Reliable Connection (RC) protocol which is generally defined by the InfiniBand architecture but can be used over an Ethernet fabric as well. iWARP may be used for lossy Ethernet since it makes use of TCP, which provides back-off upon packet loss as well as retransmissions and handling of out-of-order packets. RC may be used for lossless Ethernet since it does not include the complexity and overhead of congestion control (slow start and back-off), which is not necessary at the transport protocol level for lossless Ethernet.

Figure 2:
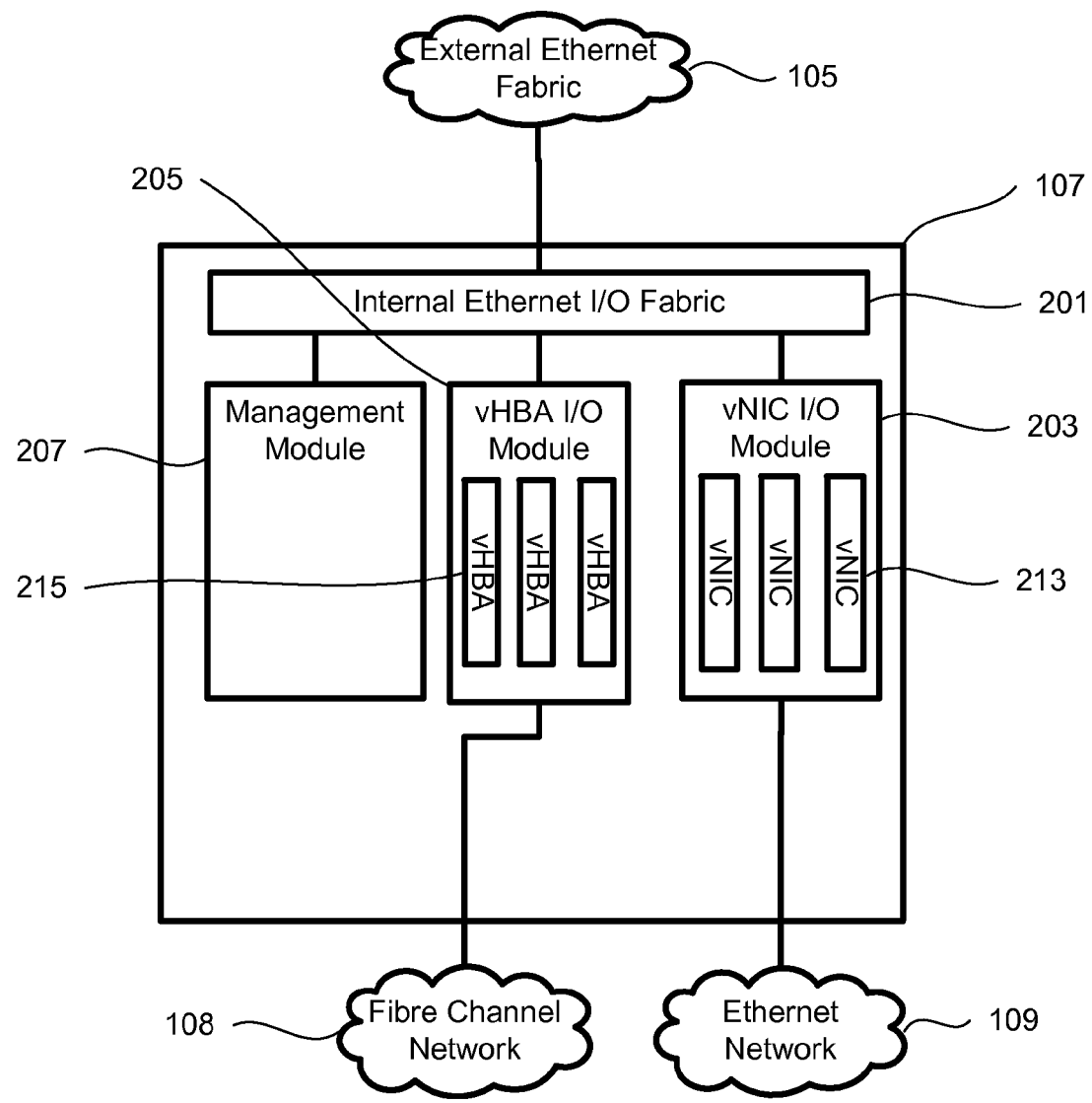
FIG. 2 is a diagrammatic representation showing an Input/Output Director (IOD) platform.
Figure 3:
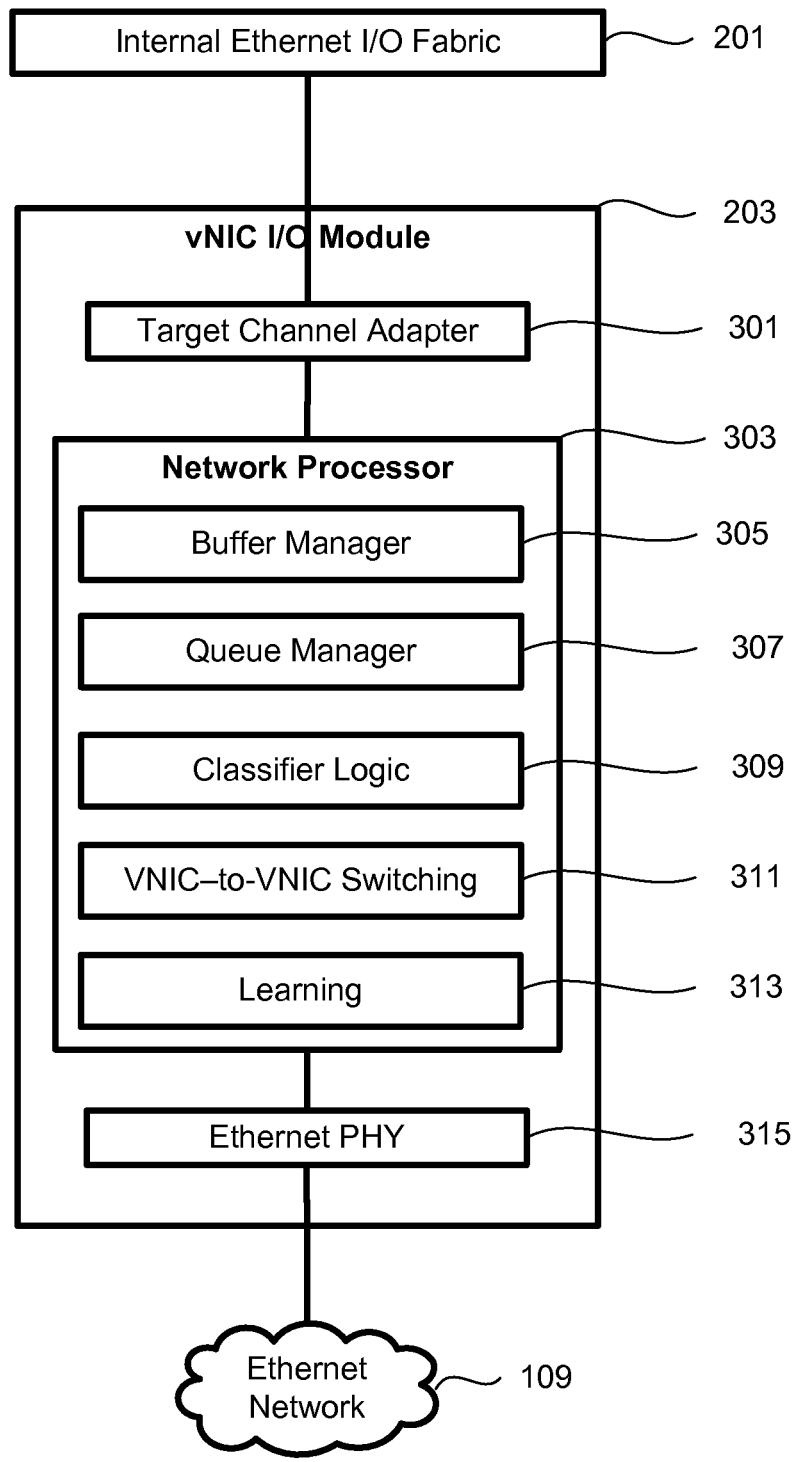
FIG. 3 is a diagrammatic representation showing an example of a Virtual Network Interface Card (vNIC) module.

FIG. 2 is a diagrammatic representation showing one example of an IOD 107. I/O modules are connected to multiple servers through an internal Ethernet fabric 201 and, in certain embodiments, an external Ethernet fabric 105. These Ethernet fabrics can be lossy or lossless. An IOD 107 may contain one or more I/O modules of the same type or a combination of I/O modules of different types, such as vHBA I/O module 205 and vNIC I/O module 203. Virtual I/O devices, such as vNICs 213 and vHBAs 215 are implemented in the respective I/O modules. Virtual I/O devices can be assigned to servers dynamically as needed. Multiple servers may have virtual I/O resources on the same I/O modules or on different I/O modules. The I/O modules are responsible for enforcing quality-of-server guarantees, such as committed and peak data rates, for the virtual I/O devices.

The IOD 107 may also include a management module 207, which is responsible for tasks such as control, configuration, and logging.

Multiple IOD devices may exist on the same Ethernet network, and they may be managed individually or from a single central management station. Servers may have virtual I/O devices on a single IOD or on multiple IODs. Also, multiple IODs may be used in redundant pairs for fault-tolerance. The failover itself may be implemented at the I/O module level, the IOD level, or within the virtual I/O device drivers on the server.

According to various embodiments, the IOD 107 can provide flexible termination points for the I/O resources assigned to servers. The IOD 107 may be connected to multiple Ethernet networks 109 and/or Fibre Channel networks 108. Connection of a server to one or more networks is performed by assigning the server's vNICs and/or vHBAs to these networks. Therefore, servers can be connected to different physical networks without a need for re-cabling or any other physical intervention.

Similarly, I/O resources can be moved from one server to another. For example, a vNIC 213 which was originally assigned to one server (e.g., server 101 in FIG. 1) may be reassigned to another server (e.g., server 102 in FIG. 1). In certain embodiments, vNICs retain their MAC address on the Ethernet network. In another example, a vHBA can be moved between servers while maintaining the same worldwide name (WWN) on the Fibre Channel network. This allows changing the I/O identity of a server such that it may assume the identity of another server. This functionality may be useful when exchanging servers, e.g., during server failover or bringing down a server for maintenance. For example, if a server fails or needs to be removed, the server identity can be moved to another operational server. If the server is booted from a remotely stored boot image on the SAN or the network, the entire server identity (including both its I/O identity and the image that it runs) can be migrated between servers. I/O migration is also useful in cases of virtual machine migration where there may be a need to migrate the I/O resources used by the virtual machine along with the virtual machine itself.

Virtual machines running on the servers may be assigned their own dedicated virtual I/O devices on the IOD 107. Since the I/O modules within the IOD 107 are capable of enforcing quality-of-service guarantees, this provides a way to divide I/O capacity between virtual machines, and make sure that a virtual machine gets no more than a predetermined share of I/O resources, thus preventing one virtual machine from limiting the I/O resources available to other virtual machines.

IODs may be used to offload the network switching from virtual machine hypervisors. Typically, virtual machines communicate over a virtual switch, which is implemented within the hypervisor software on the server. External switching provided at IOD 107 may be used to enhance control or security. In certain embodiments, each virtual machine can be assigned its own dedicated vNIC 213 on IOD 107, and in this case all switching is performed externally.

The internal Ethernet I/O fabric 201 of an IOD may serve a dual purpose. First, it is an Ethernet switch, which provides communication between the servers and the I/O modules, such as vHBA module 205 and vNIC module 203. Second, as a switch, the internal Ethernet I/O fabric can provide direct communication between the servers. This communication may consist of standard TCP or UDP traffic. Furthermore, RC, iWARP, and other similar transport protocols, which are utilized for providing reliable high-performance communication between the servers and the I/O modules, can be used for server-to-server communication. This allows using high-performance communication protocols and libraries, such as Sockets Direct Protocol (SDP), Reliable Datagram Sockets (RDS), and Message Passing Interface (MPI), for server-to-server communication while using the vNIC and vHBA capabilities of the IOD at the same time.

Figure 4:
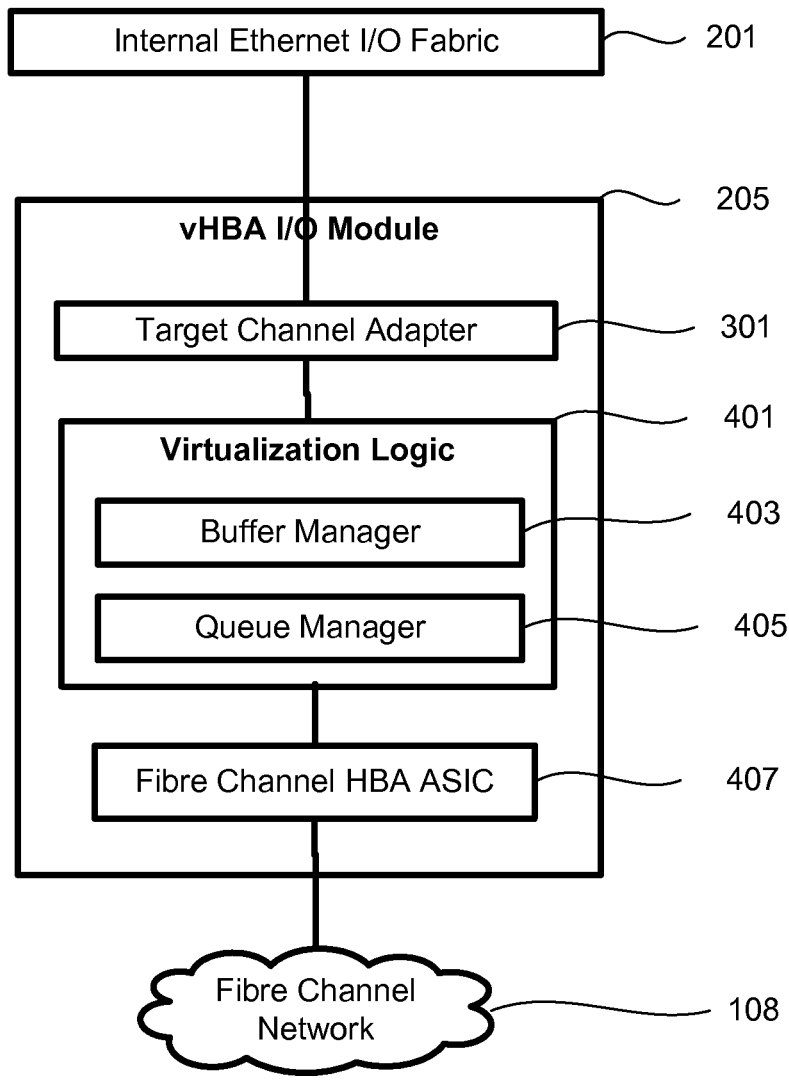
FIG. 4 is a diagrammatic representation showing an example of a Virtual Host Bus Adapter (vHBA) module.

The target channel adapter (TCA) is a device which connects one or more I/O modules (e.g., vHBA module 205, vNIC module 203) of the IOD 107 to the Ethernet I/O fabric, such as Internal Ethernet Fabric 201. In certain embodiments, each I/O module contains a TCA as shown in FIGS. 4 and 5. A TCA can be a discrete device, or its functionality can be integrated into another device of the I/O module. A TCA may recognize and terminate various transport protocols (iWARP, RC, etc.)

In certain embodiments, when a server transmits a data packet to an I/O module, the corresponding TCA removes the link and transport protocol headers (e.g., Ethernet link headers, iWARP/TCP/IP, RC, or other transport headers) from the packet and then forwards the packet with an internal header to the next stage of the I/O module, such as the vNIC network processor or the vHBA virtualization logic, which are further described below in the context of FIGS. 4 and 5. When an I/O module sends a data packet to a server, the TCA is responsible for adding the appropriate link and transport protocol headers similar to the ones described above. An internal I/O module protocol (e.g., SPI-4, which is one example of the System Packet Interface protocols; other examples may be used in certain embodiments) may be implemented between the TCA and the network processor or virtualization logic.

FIG. 4 is a diagrammatic representation showing an example of a vNIC I/O module 203. In addition to TCA 301 and the Ethernet physical layer (PHY) component 315, which provides physical connectivity to the Ethernet network 109, the module 305 may include a buffer manager 305, a queue manager 307, classifier logic 309, vNIC-to-vNIC switching logic 311, and learning logic 313. These elements may be implemented in a network processor 303 or in hardware, such as a field-programmable gate array (FPGA) or an application-specific integrated circuit (ASIC). The network processor 303 may also include the TCA functionality within the same device.

According to various embodiments, the classifier logic 309 includes header parsing and lookup logic configured to identify information, such as packet destination, priority, and TCP port. The classifier logic 309 can be used to filter incoming data or apply traffic engineering policies. In some instances, the classifier logic 309 can be used to block packets in order to implement a firewall. In certain embodiments, the buffer manager 305 manages data in memory. In the same or other embodiments, the queue manager 307 manages packet queues and performs traffic engineering tasks, such as traffic "policing" (i.e., enforcing committed and peak data rates available for each vNIC), shaping, and prioritizing based on results from classier logic 309 and configuration information. The queue manager 307 may also perform load-balancing operations by distributing incoming traffic across multiple vNICs.

Multiple vNICs may terminate on the same vNIC I/O module Ethernet port. Typically, different vNICs have distinct MAC addresses that are visible on the Ethernet network. As a result, services that rely on MAC addresses, such as Dynamic Host Configuration Protocol (DHCP), are not disrupted.

The vNIC-to-vNIC switching logic 311 performs packet forwarding between vNICs terminating on the same Ethernet port. It maintains a table of corresponding vNICs and MAC addresses and performs packet forwarding based on MAC addresses using a process similar to the one used in regular Ethernet switches. For example, if vNIC_1 is linked to address MAC_1, and a data packet having MAC_1 as its destination address is received on vNIC_2 which terminates on the same Ethernet port as vNIC 1, then the vNIC-to-vNIC switching logic 311 forwards this packet to vNIC_1. This functionality enables using an IOD with external switches that do not forward packets to the same link that they came from, so the switching is performed in this case within I/O modules themselves.

In certain embodiments, the vNIC I/O module 203 also has learning logic 313, which is used to establish a mapping of vNICs created by virtualization software (on the servers) to vNICs of the IOD 107. When a server is virtualized and one or more virtual machines are created on the server, each virtual machine can be associated with one or more vNICs, which are implemented by the server virtualization software. These vNICs are also referred to as Virtual Machine vNICs or simply VM vNICs. Each VM vNIC has a MAC address, which is assigned by the virtualization software. One or more VM vNICs may be bridged to a single vNIC of the IOD 107 using a software virtual switch, which is implemented by the virtualization software. In these embodiments, the traffic of multiple VM vNICs may appear on the same vNIC of the IOD 107, and this traffic may consist of packets with different source MAC addresses for the different VM vNICs. The vNIC I/O module 203 needs to establish a mapping between a VM vNIC MAC addresses and a corresponding vNIC of the IOD 107. This mapping enables directing incoming traffic to the correct vNIC of the IOD 107. For example, if a packet with destination MAC address MAC_1 arrives at the I/O module Ethernet port, and MAC_1 is the address of VM vNIC_1, then the I/O module needs to know which vNIC of the IOD 107 should receive this packet. In certain embodiments, a lookup is performed in a mapping table to establish this IOD vNIC to VM vNIC correspondence.

The mapping table may be populated by the learning logic 313 as packets arrive from the servers. In certain embodiments, the learning logic examines the source MAC addresses of the packets arriving on the different vNICs of the IOD 107 and populates the mapping table according to the observed source MAC addresses. For example, if a packet with source MAC address MAC_1 arrives on vNIC_5 of the IOD 107, then the learning logic 313 may insert an entry in the mapping table specifying that MAC_1 belongs to vNIC_5. Later, when a packet with destination address MAC_1 arrives from the network, the I/O module knows from the mapping table that the packet should be directed to vNIC_5.

In certain embodiments, data transfer between servers and their assigned vNICs is flow controlled per individual vNIC. The flow control may be provided by a transport protocol used for communication between servers and their remote I/O resources. When standard internal NICs are overwhelmed with transmitted traffic, a transmit queue becomes filled to capacity and the driver or application issuing the packets determines that no additional packets can be sent. Therefore, in certain embodiments, the flow control is achieved all the way to the application generating the traffic. This approach may be more desirable than dropping packets that cannot be transmitted. vNICs of the IOD 107 may be configured to provide similar functionality. Since a reliable transport protocol is used between the servers and the IOD 107, the vNIC driver on the server can queue packets until they are consumed by the remote vNIC I/O module. If the queue is full, the driver may notify the sender that it has run out of transmit buffer space in the same fashion that a local NIC driver performs this task.

FIG. 4 is a diagrammatic representation showing an example of a vHBA I/O module 205. In addition to the TCA 301, the module 305 may include a buffer manager 403, a queue manager 405, and a Fibre Channel HBA device 407 to be virtualized. These elements may be implemented in a network processor or in hardware, such as FPGA or ASIC, which may also include the TCA functionality within the same device.

According to various embodiments, the server sends an I/O control block (IOCB) containing a command (e.g. a SCSI command) as well as various I/O control information, such as buffer information for data to be read or written. This IOCB propagates to the HBA according to the flow protocols described below. The two basic commands are the ones for reading data from and writing data to a target storage device.

The vHBA I/O module 205 may provide N_Port ID virtualization (NPIV) functionality. NPIV enables multiple Fibre Channel initiators to share a single physical port. For example, each vHBA can be viewed as a separate initiator on the port. In this case, each vHBA that terminates on the port appears with its own world-wide name (WWN) on the Fibre Channel fabric. This approach makes management of vHBAs similar to other HBAs, including functions like Fibre Channel zoning configuration.

In certain embodiments, the vHBA buffer manager 403 is responsible for managing buffering of data when it is transferred from the servers to the Fibre Channel HBA 407, and vice versa. The queue manager 405 may be used to enforce quality-of-service properties on the data transfer. For example, the queue manager 405 may modulate the transfer of data to and from the servers per vHBA to comply with the committed and peak bandwidth configurations for each vHBA. In certain embodiments, data transfers are initiated by the vHBA I/O module 205 using RDMA Read operations for reading data from server memory and RDMA Write operations for writing data to server memory, which is described further in more details. Servers typically do not initiate data transfers. Instead, the servers are configured to send commands. As such, quality-of-service guarantees may be provided at the granularity of individual vHBAs, which is not available in other conventional approaches, such as encapsulation of Fibre Channel over Ethernet (FCoE). FCoE does not provide throttling of an individual flow of HBA traffic since there are no FCoE or Ethernet flow control mechanisms which operate at the granularity of individual HBAs. FCoE only enables flow control of an entire link or an entire traffic class, which is an inherent limitation of FCoE.

In certain embodiments, a vHBA is configured to boot a server from an image stored in a storage device on the Fibre Channel network. For example, software residing on flash memory of the server, such as the expansion memory on the Ethernet NIC of the server, may be used for this purpose. When a server boots, it may execute the software residing in this memory. This software, in turn, discovers a boot vHBA, which is assigned to the server on an IOD, and proceeds to boot the server from a storage device, which is assigned to the server as its boot device. The assignment of servers to boot devices can be configured through the IOD management system. Such functionality enables changing the server's purpose, thus achieving the decoupling of both the I/O profile and the boot image from the server. In other words, the server's entire identity can be changed dynamically, which includes both its I/O connectivity and its operating system.

It should be understood that Fibre Channel is just one example of a storage connectivity technology that can be used for the described systems and methods. Other storage connectivity technologies include Internet Small Computer System Interface (iSCSI), Serial ATA (SATA), and Serial Attached SCSI (SAS).

Figure 5A:
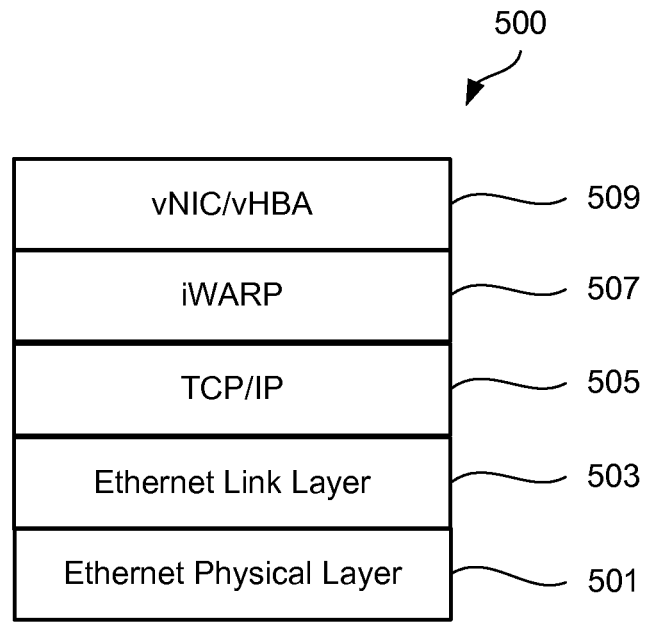
FIGS. 5A and 5B are diagrammatic representations showing two examples of protocol stacks.

FIG. 5A illustrates one example of a protocol stack 500, which can be used for virtual I/O data transfers between servers and their remote I/O devices. In certain embodiments, a virtual I/O protocol 509, such as vNIC and vHBA, runs on the top of the iWARP protocol 507, which provides a remote direct memory access (RDMA) capability. This enables an I/O module within an IOD to place data directly into a memory buffer on the server. iWARP 507 uses the service of the TCP/IP protocol 505 to achieve reliable transmission and back-off in cases of packet loss. Support for slow start and back-off as provided by TCP/IP 505 enables using lossy Ethernet fabrics for connecting an IOD 107 to servers 101-103. TCP/IP 505 can also be used for lossless Ethernet fabrics.

Figure 5B:
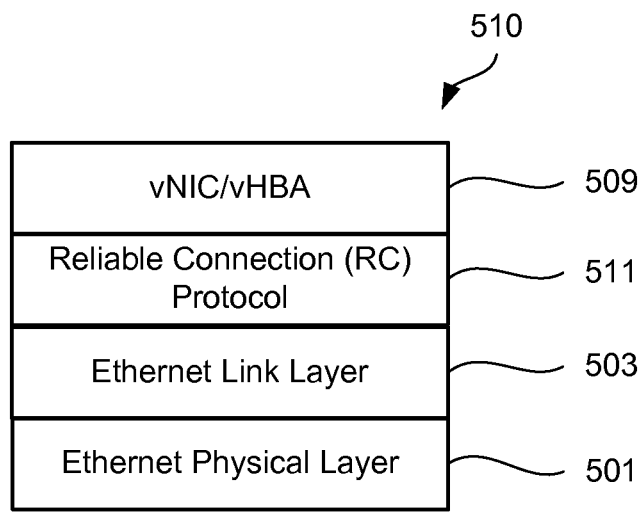

FIG. 5B shows another example of a protocol stack 510, in which the virtual I/O protocol runs on the top of the Reliable Connection (RC) protocol 511. The RC protocol 511 as defined by the InfiniBand architecture may run on Ethernet in certain embodiments. The RC protocol 511 provides RDMA. However, unlike iWARP in the example described above, the RC protocol 511 may not be positioned on top of TCP since the RC protocol 511 already provides reliable transmission. In certain embodiments, the RC protocol 511 does not provide back-off and slow start for handling congestion conditions, which may make it more applicable for lossless Ethernet fabrics, which are flow controlled. Implementation of the RC protocol 511 may be less complex than a combination of iWARP 507 and TCP 505 protocols illustrated in FIG. 5A, particularly when a hardware-based TCA is used. Also, the RC protocol 511 does not incur certain overheads, which may be associated with TCP protocols, such as the increased latency resulting from slow start.

Figure 6A:
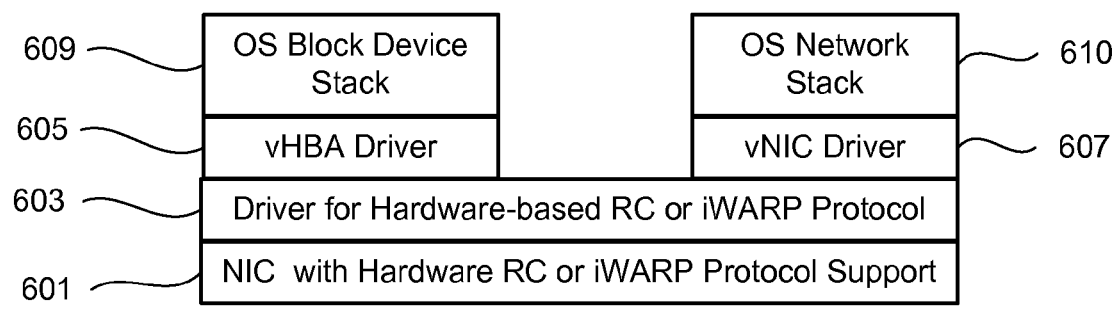
FIGS. 6A and 6B are diagrammatic representations showing two examples of device driver stacks.
Figure 6B:
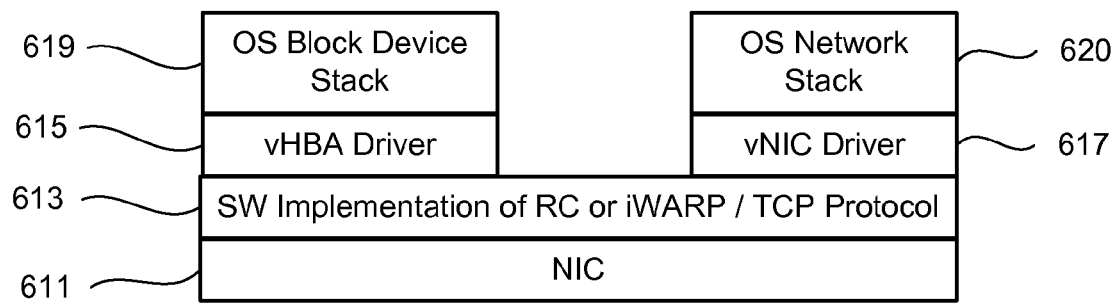

FIGS. 6A and 6B are diagrammatic representations of virtual I/O server driver stack examples using a hardware-based implementation of the transport protocol (in FIG. 6A) and a software-based implementation of the transport protocol (in FIG. 6B). From the perspective of the operating system running on the server, storage devices on the Fibre Channel network connected to the IOD vHBA module appear as block devices. In certain embodiments, this may resemble a case where the Fibre Channel network is connected to a local HBA device rather than to a remote vHBA device. Similarly, vNICs may appear as network devices that resemble local physical NICs. Virtual I/O device drivers may perform similar to physical I/O device drivers from the perspective of the upper OS layers. The difference between virtual I/O devices and physical I/O devices may be in their communication with the hardware that they control. In the case of physical I/O devices, the driver may control a local device over a local bus, such as PCI Express. In the case of virtual I/O devices provided by an IOD, the driver communicates with a remote I/O module over a reliable transport protocol running over a lossless or lossy Ethernet fabric.

FIG. 6A shows a driver stack example where a server contains a NIC 601 with hardware support for the reliable transport protocol, such as RC, iWARP, or similar. This approach may deliver high levels of performance since it can provide hardware segmentation and reassembly between packets and larger messages. In certain embodiments, a hardware-based implementation of the transport protocol can also provide zero-copy transfers during receiving and transmitting leading to low CPU overhead.

FIG. 6B shows a driver stack example where a server contains a NIC 611 without hardware support for the reliable transport protocol. Instead, this support is provided in a software layer 613. This approach may lead to higher overhead and lower performance than the hardware approach of FIG. 6A. However, software-based implementation of the transport protocol may provide wider applicability for the IOD device since hardware reconfiguration may not be needed (e.g., opening servers and installing specialized NIC devices or replacing with servers with such NIC devices pre-installed). Thus, this approach may be used where hardware configuration costs may offset lower performance considerations.

Description of the elements (601-620) illustrated in FIGS. 6A and 6B is provided throughout the detailed description.

A NIC driver typically includes a packet transmit path and a packet receive path. The packet transmit path is activated whenever the upper level software passes a packet to the driver. The packet receive path is activated when the NIC receives a packet from the network, and it needs to forward the packet to the upper layers of the network stack.

In certain embodiments, a vNIC driver implements the transmit and receive paths. Packets to be transmitted may be queued in a transmit queue. The packets are sent to the remote vNIC I/O module using the reliable send operation (such as RC Send) of the transport protocol. The vNIC I/O module will then send the packet to the external Ethernet network. Once the send is complete, the packet is de-queued from the transmit queue. Since the transport protocol is reliable, the completion of the send operation signifies that the vNIC I/O module acknowledged that the packet was received. For the vNIC receive path, the driver uses the receive operation (such as RC Receive) of the transport protocol. The receive operation is asynchronous. When the vNIC I/O module receives a packet from the external Ethernet network, and the packets needs to be sent to the server, the I/O module performs a send operation, which results in a completion of a receive operation on the server. The driver is notified of the completion, and it then processes the new packet by forwarding it to the network stack.

Figure 7:
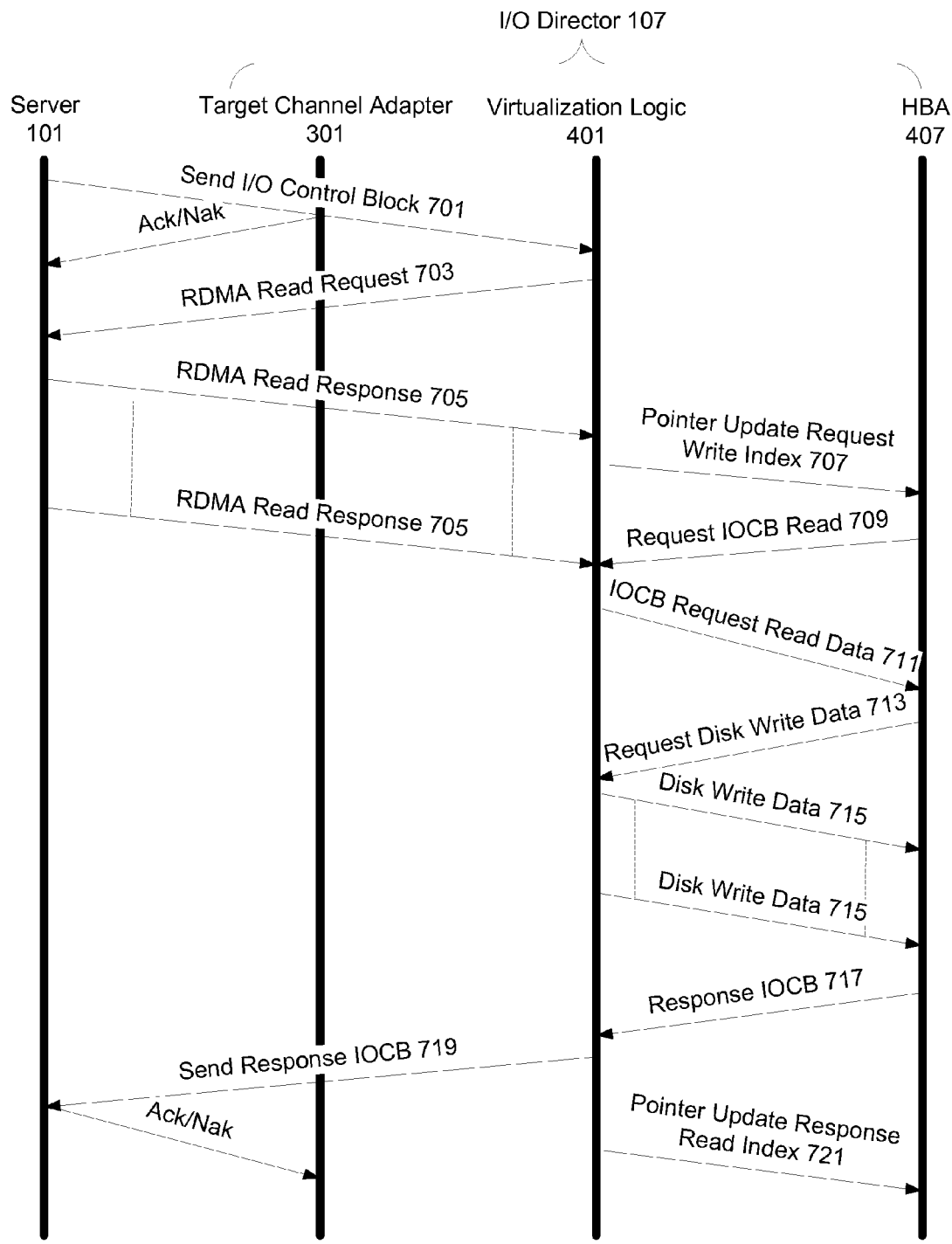
FIG. 7 is a diagrammatic representation showing an example of a vHBA write flow protocol that may be used over an Ethernet fabric for writing data to storage devices.

FIG. 7 is a diagrammatic representation showing an example of a write flow where a server is performing a write operation to a device on the Fibre Channel network connected to a vHBA I/O module. The process involves one of the servers 101-103 (e.g., a server 101), a target channel adapter 301, virtualization logic 311, and an HBAs 317. The Fibre Channel target device in this example may be a disk drive.

The write flow starts with a server 101 sending an I/O control block (IOCB) to the TCA 301 (arrow 701) according to certain embodiments. For example, an IOCB may be sent by an RC Send command with one or more IOCBs. A wide variety of IOCB formats are available. In many embodiments, an IOCB includes a buffer memory address, and a buffer length. Furthermore, it may include a write command, such as a SCSI Write. Multiple buffer address and length values may be provided in the event that the buffer is fragmented and needs to be represented as a scatter-gather list. Furthermore, a queue of the vHBA I/O module may be configured to store 32, 64, 128, or any other number of outstanding commands at one time. Once the IOCB reaches the target channel adapter 301, the adapter may reply with an acknowledgement and pass the command to the virtualization logic 401 for processing using an internal protocol (e.g., with Ethernet headers removed).

According to various embodiments, the virtualization logic 401 then requests the data to be written from the server memory, for example, by sending an RDMA Read Request 703 back to the server 101. The server 101 replies and initiates a data transfer associated with RDMA Read responses 705 in FIG. 7. When the first RDMA read response reaches the virtualization logic 401, the logic updates a pointer of the corresponding HBA 407. The updated pointed indicates that there is a new request in the IOCB queue. The HBA 407 proceeds with requesting an IOCB read 709 from the virtual logic 401. The IOCB data 711 is forwarded to the HBA, which triggers a request for disk write data 713 from the HBA 407. The data is then transferred ("written") from the virtualization logic 401 memory to the HBA 407 as disk write data 715. The sequence of requesting disk write data 713 and 716 may be repeated. Finally, when all data is transferred, the HBA 407 sends a completion message, such as a response IOCB 717 to the virtualization logic 401, which is then forwarded back to the server 301 as Send Response IOCB 719 using, for example, an RC Send operation. The server 101 may reply back to the target channel adapter 301 with an acknowledgement. Finally, the virtualization logic 401 updates the pointer to indicate that the response queue entry can be reused 721.

In general, the write flow may be considered as a combination of two protocols. The first protocol is one between the servers 101-103 and the virtualization logic 401, which includes the target channel adapter 301. The second protocol is between the virtualization logic 401 and the HBA 407.

Figure 8:
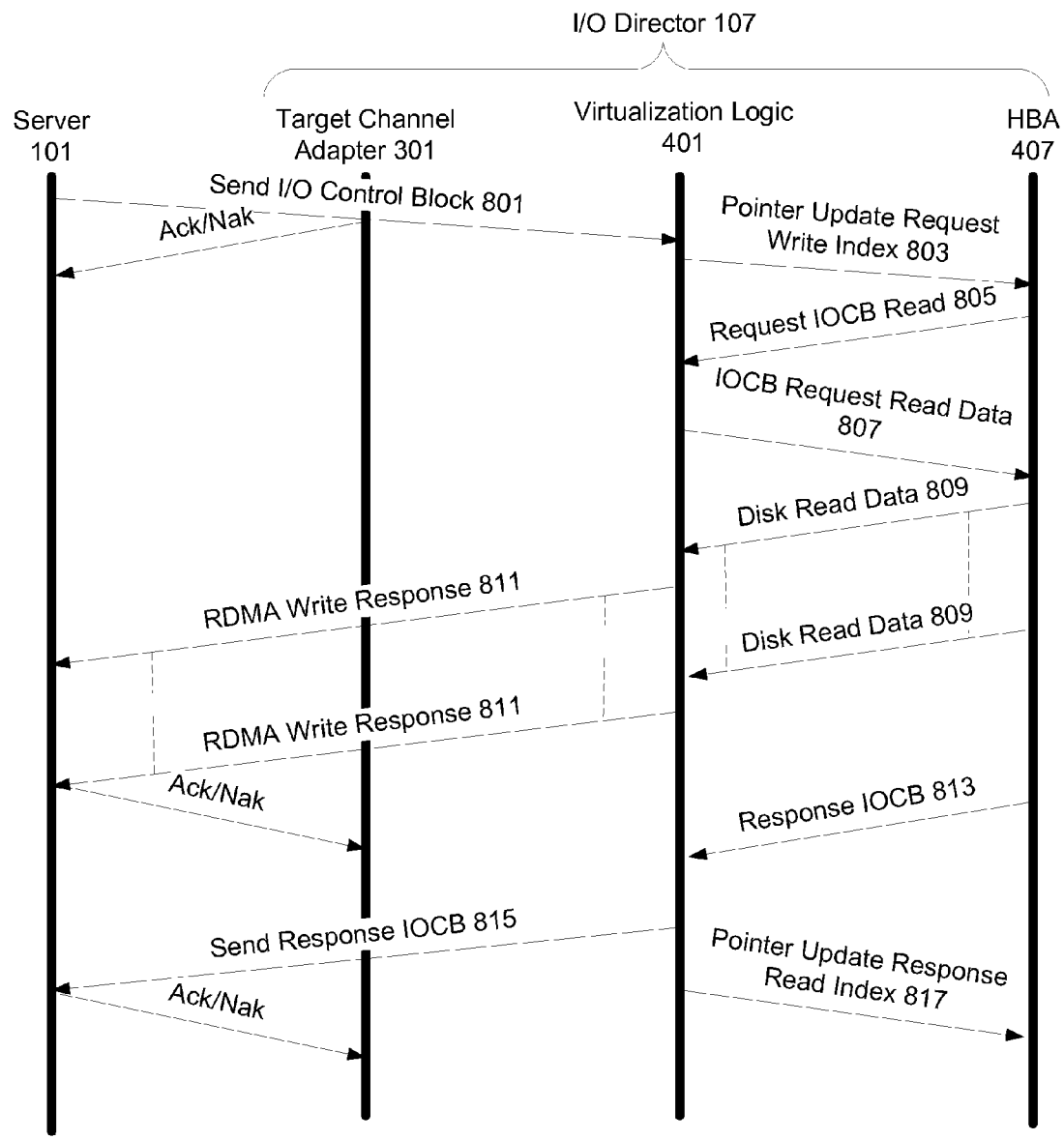
FIG. 8 is a diagrammatic representation showing an example of a vHBA read flow protocol that may be used over an Ethernet fabric for reading data from storage devices.

FIG. 8 is a diagrammatic representation showing one example of a read flow where a server is performing a read operation from a device on the Fibre Channel network connected to a vHBA I/O module. Similarly to the write flow described above, the process involves one of the servers 101-103 (e.g., server 101), a target channel adapter 301, virtualization logic 401, and one of the HBAs 407.

According to various embodiments, the write flow starts with the server 101 sending an I/O control block (IOCB) using an RC Send operation to TCA 301. In certain embodiments, an IOCB includes a buffer memory address, and a buffer length. In addition, it may include a read command, such as a SCSI Read. The buffer information specifies the memory area on the server where the read data should be placed. Once the IOCB reaches the target channel adapter 301, the adapter may reply with an acknowledgement and pass the command to the virtualization logic 401 for processing.

The virtualization logic 401 then updates the pointer of the HBA 407 to indicate a new IOCB on the request queue. The HBA 407 requests the IOCB from the virtualization logic 401 by sending an IOCB request command 805. The IOCB is then forwarded 807 to the HBA 407. The data read from the disk is then transferred from the HBA 407 to the memory of the virtualization logic 401 in a series of transfers 809. The virtualization logic 401 fetches the data from the memory and sends it to the server as RDMA Write commands 811. The server may respond with an acknowledgement after receiving the last data packet. Once all data is read from the HBA 407, it sends a completion message, shown as Response IOCB 813, to the virtualization logic 401. This response is then forwarded to the server 101.

Finally, the virtualization logic 401 updates the response queue index 817, so that the response queue entry can be reused.

In addition to the RC protocol referenced above, any other RDMA protocol applicable over Ethernet fabrics, such as iWARP, may be used.

In addition to the buffered approaches described above for the vHBA write and read flows, a cut-through approach may be implemented in certain embodiments. With a cut-through approach, RDMA Read data arriving at the virtualization logic 401 from the server 101 is sent immediately to the HBA 407 without buffering. Similarly, data arriving at the virtualization logic 401 from the HBA 407 is sent immediately to the server 101 by RDMA Write without buffering.

Figure 9:
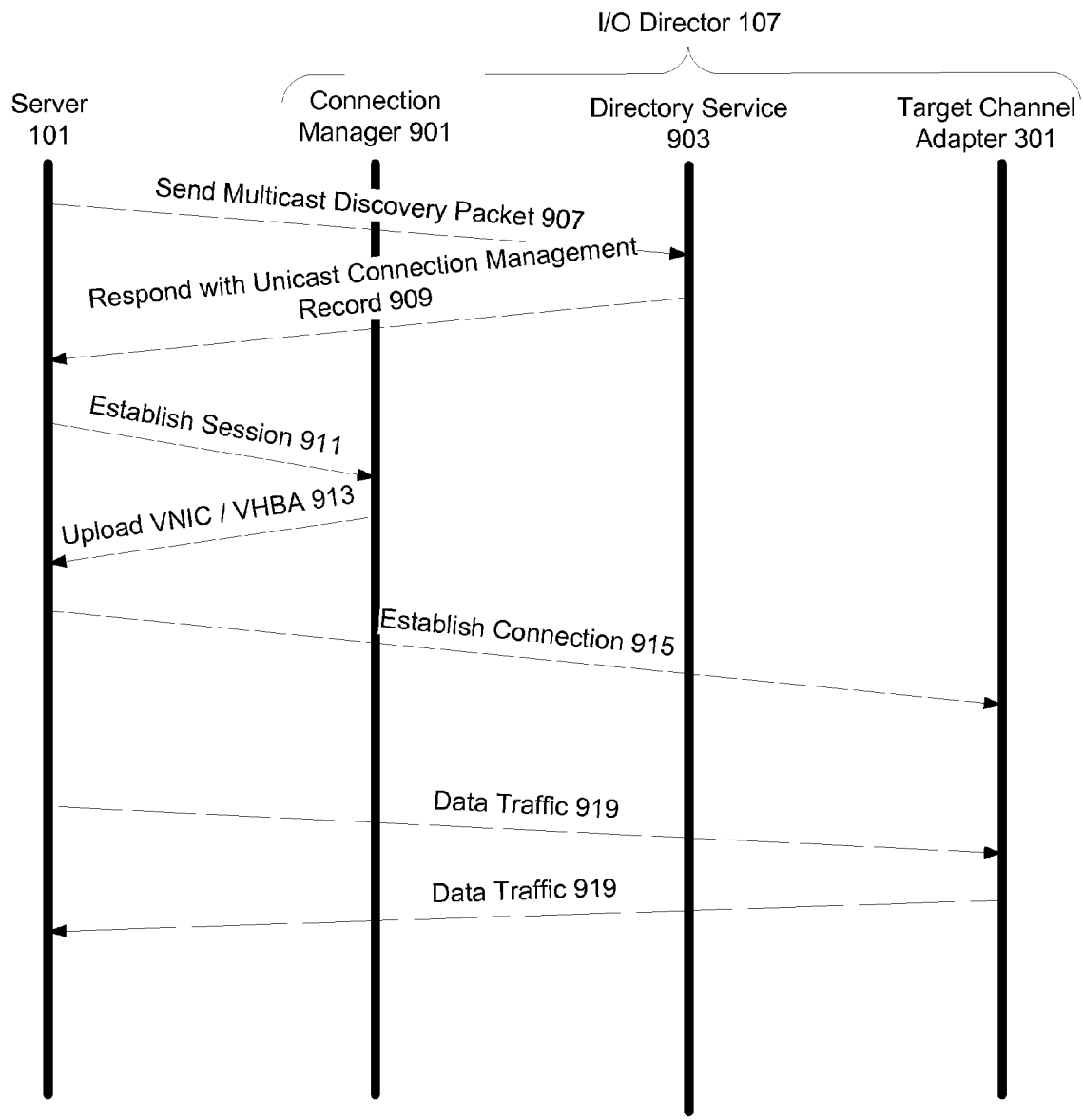
FIG. 9 is a diagrammatic representation showing one example of a management protocol that may be used over an Ethernet fabric for discovering an IOD and establishing communication between servers and the IOD as well as its I/O modules.

FIG. 9 is a diagrammatic representation showing one example of a management protocol over an Ethernet fabric. This protocol may be used to enable servers to discover their remote I/O resources on the Ethernet I/O fabric and to establish communication with the relevant IODs and I/O module TCAs. The virtual I/O driver software running on the servers 101-103 allows the servers to transmit multicast discovery packets that initiate a management (or discovery) process described herein. The management module 105 in each of the IODs 107 executes a session manager 901 and a discovery service 903. The ultimate targets for communication are one or more TCAs, such as 301 shown in FIG. 9, since they represent the I/O module end point.

According to certain embodiments, the multicast discovery packets are sent (arrow 907) to a pre-established (and known to the server) multicast address, i.e., that of directory service 903, using Ethernet layer 2 multicast. All IODs on the same Ethernet network are configured to listen to multicast discovery packets, which are sent to the address known to the server. The discovery packet may contain server information (e.g., name, OS version, MAC address, firmware version, and other information). Any IOD that receives this packet creates a server object within the information model with the attributes contained in the discovery packet. If a server profile is present for this physical server 101 on the IOD, the directory service 903 responds to the server 101 with a unicast packet that contains information about the IOD (arrow 909). The server 101 then uses the information contained in the unicast packet to establish a connection with the session manager 901 of the IOD 107 over a reliable communication channel (arrow 911). Once the session has been established, the session manager 901 uploads to the server information on the virtual I/O resources, such as vNICs and vHBAs, allocated to the server (arrow 913) and information on how to reach these resources.

FIG. 9 also illustrates server 101 using the information obtained from the IOD to establish a connection with a target channel adapter 301 (arrow 915), and transfer data (arrow 919) in accordance with the read and write protocols described above. The server obtains the address of TCA 301 from the session manager during the uploading of the information about virtual I/O devices assigned to the server (arrow 913). TCA 301 resides on an I/O module which includes virtual I/O devices which are assigned to the server.

Figure 10:
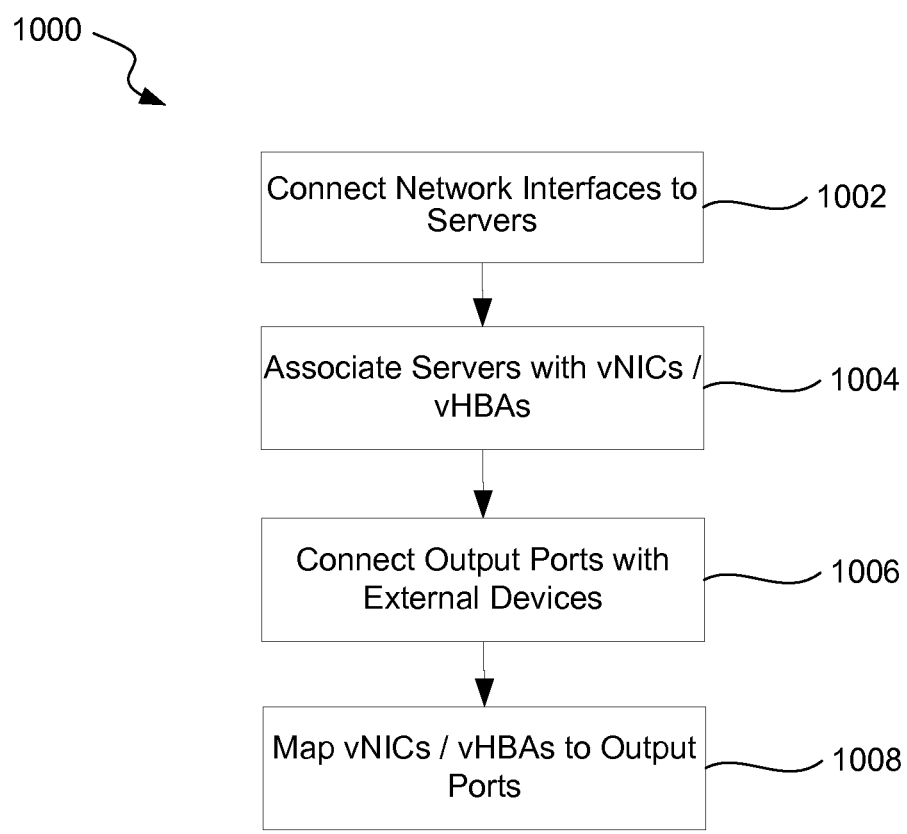
FIG. 10 illustrates a technique for virtualizing I/O resources in accordance with certain embodiments.

FIG. 10 illustrates a technique for virtualizing I/O resources in accordance with certain embodiments. The process 1000 may start with connecting multiple Ethernet network interfaces of the IOD to multiple servers (block 1002). The connection may be performed using a lossy Ethernet fabric or a lossless Ethernet fabric. According to various embodiments, the servers include NICs in order to connect to the Ethernet network interfaces using an Ethernet I/O fabric. The IOD may include an Ethernet switch in order to connect to the servers over the Ethernet fabric. The Ethernet switch may be a lossless Ethernet switch or a lossy Ethernet switch.

An IOD may contain one or more I/O modules of the same type or a combination of I/O modules of different types, such as vHBA I/O module and vNIC I/O module. Virtual I/O devices, such as vNICs and vHBAs are implemented in the respective I/O modules. The process 1000 may continue with servers being associated with vNICs and/or vHBAs of the IOD (block 1004). Multiple servers may have virtual I/O resources on the same I/O modules or on different I/O modules. The I/O modules may be responsible for enforcing quality-of-server guarantees, such as committed and peak data rates, for the virtual I/O devices.

According to various embodiments, the IOD can provide flexible termination points for the I/O resources assigned to servers. The IOD may be connected to multiple Ethernet networks and/or Fibre Channel networks. In certain embodiments, the process 1000 includes operation 1006 for connecting multiple output ports of the IOD to multiple external devices. Connection of a server to one or more networks is performed by assigning the server's vNICs and/or vHBAs to these networks. Therefore, servers can be connected to different physical networks without a need for re-cabling or any other physical intervention.

The process 1000 may include operation 1008 for mapping vNICs and vHBAs to the output ports. Various embodiments of this operation are described above in the context of management protocol, learning, and other processes.

Although the foregoing invention has been described in some detail for purposes of clarity of understanding, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. A system for virtualizing I/O resources, comprising:
   a first Ethernet network;
   a second Ethernet network;
   a plurality of servers connected with the first Ethernet network, the plurality of servers comprising one or more processors and memory; and
   an I/O director connected with the first Ethernet network and the second Ethernet network, the I/O director providing one or more common, shared Network Interface Controllers (NICs) and Host Bus Adapters (HBAs) to the plurality of servers, the I/O director comprising:
      a plurality of Ethernet network interfaces connected to the plurality of servers over the first Ethernet network, the plurality of servers associated with a plurality of virtual network interface cards executed by the I/O director and shared by the plurality of servers;
      a first plurality of output ports connected to a first plurality of external devices over the second Ethernet network;
      a network processor operable to map the plurality of virtual network interface cards with the first plurality of output ports, wherein the network processor is further operable to maintain a plurality of media access control (MAC) addresses for the plurality of servers;
      a management module communicating with each of the plurality of servers using a management protocol over the first Ethernet network, wherein the servers:
         establish communication with the I/O director using the management protocol; and
         discover remote I/O resources on the second Ethernet network using the management protocol;
      a directory service communicating with each of the plurality of servers using the management protocol over the first Ethernet network, wherein:
         the plurality of servers each comprise virtual network interface card drivers;
         the plurality of servers discover the remote I/O resources of the second Ethernet network by transmitting multicast discovery packets according to the management protocol from the virtual network interface card drivers to the directory service, the multicast discovery packets comprising server identifiers and corresponding server attributes; and
         the directory service processes the multicast discovery packets, creates server objects based at least in part on the multicast discovery packets, determines whether the I/O director retains corresponding server profiles, and responds to the plurality of servers with unicast packets containing first information facilitating establishment of connections with a session manager of the I/O director;
      a virtual network interface card module comprising learning logic configured to establish a mapping of the plurality of virtual network interface cards to the one or more MAC addresses, at least in part by populating a mapping table as data packets arrive from one or more servers of the plurality of servers; and
      the session manager of the I/O director, in response to one server of the plurality of servers establishing a connection with the session manager using the first information of the unicast packets, uploads to the one server of the plurality of servers second information on one or more of the virtual network interface cards and/or virtual host bus adapters allocated to the one server.

2. The system of claim 1, wherein mapping of the plurality of virtual network interface cards with the first plurality of output ports is performed dynamically.

3. The system of claim 1, further comprising a second plurality of output ports connected to a second plurality of external devices over a first Fibre Channel network.

4. The system of claim 3, wherein the plurality of servers is associated with a plurality of virtual host bus adapters and wherein the network processor is operable to map the plurality of virtual host bus adapters with the second plurality of output ports.

5. The system of claim 4, wherein mapping of the plurality of virtual host bus adapters with the second plurality of output ports is performed dynamically.

6. The system of claim 4, wherein the plurality of servers comprises virtual host bus adapter drivers.

7. The system of claim 6, wherein the virtual host bus adapter drivers are hardware implemented.

8. The system of claim 4, wherein at least one of the plurality of servers is virtualized to provide one or more virtual machines and wherein the one or more virtual machines are associated with the plurality of virtual host bus adapters.

9. The system of claim 4, further comprising a target channel adapter, wherein the target channel adapter is configured to remove transport protocol headers from data packets received from the plurality of servers, to assign internal headers to the data packets, and to send the data packets with the internal headers to the virtual host bus adapters.

10. The system of claim 4, further comprising a virtual host bus adapter module, wherein the virtual host bus adapter module includes the virtual host bus adapters, a buffer manager, and a queue manager.

11. The system of claim 10, wherein the virtual host bus adapter module is implemented in one or more elements selected from a group consisting of a field-programmable gate array (FPGA) and an application-specific integrated circuit (ASIC).

12. The system of claim 4, wherein Quality of Service is provided by the system for each virtual host bus adapter of the plurality of virtual host bus adapters.

13. The system of claim 1, further comprising a second plurality of output ports connected to a second plurality of external devices, wherein the plurality of servers is associated with a plurality of adapters selected from a group consisting of serial ATA (SATA) adapters, serial attached SCSI (SAS) adapters, RAID adapters, Fibre Channel host bus adapters, and iSCSI host bus adapters, and wherein the network processor is operable to map the plurality of adapters with the second plurality of output ports.

14. The system of claim 1, wherein the first Ethernet network is lossless Ethernet.

15. The system of claim 1, wherein the first Ethernet network is lossy Ethernet.

16. The system of claim 1, wherein the virtual network interface card drivers are hardware implemented.

17. The system of claim 1, further comprising an Ethernet switch providing the plurality of Ethernet network interfaces.

18. The system of claim 1, wherein the plurality of servers communicate with the I/O director using Internet Wide Area RDMA Protocol (iWARP).

19. The system of claim 1, wherein the plurality of servers communicate with the I/O director using Reliable Connection (RC) protocol.

20. The system of claim 1, wherein at least one of the plurality of servers is virtualized to provide one or more virtual machines and wherein the one or more virtual machines are associated with the plurality of virtual network interface cards.

21. The system of claim 20, wherein Quality of Service is provided by the system for each of the one or more virtual machines.

22. The system of claim 1, wherein the I/O director provides communication among servers within the plurality of servers.

23. The system of claim 22, wherein the communication among the servers within the plurality of servers is performed using one or more protocols selected from a group consisting of Sockets Direct Protocol (SDP), Reliable Datagram Sockets (RDS), and Message Passing Interface (MPI).

24. The system of claim 1, further comprising a target channel adapter, wherein the target channel adapter is configured to remove transport protocol headers from data packets received from the plurality of servers, to assign internal headers to the data packets, and to send the data packets with the internal headers to the virtual network interface cards.

25. The system of claim 1, wherein the virtual network interface card module includes the virtual network interface cards, a buffer manager, a queue manager, classifier logic, and logic for switching between the virtual network interface cards.

26. The system of claim 25, wherein the learning logic is configured to:
examine data packets received from one or more servers of the plurality of servers on one or more virtual network interface cards of the plurality of virtual network interface cards,
identify from the data packets one or more MAC addresses of the plurality of MAC addresses, and
map the identified one or more MAC addresses to the one or more virtual network interface cards.

27. The system of claim 26, wherein the system is configured to direct data packets received from the first plurality of external devices to the one or more virtual network interface cards based on the mapping of the one or more MAC addresses and the one or more virtual network interface cards.

28. The system of claim 27, wherein the direction of the data packets received from the first plurality of external devices to the one or more virtual network interface cards is performed by the logic for switching between the virtual network interface cards.

29. The system of claim 25, wherein the virtual network interface card module is implemented in one or more elements selected from the group consisting of a field-programmable gate array (FPGA) and an application-specific integrated circuit (ASIC).

30. The system of claim 25, wherein the queue manager is configured to enforce Quality of Service to the plurality of servers over the first Ethernet network.

31. The system of claim 1, wherein the system is configured to provide Quality of Service to the plurality of servers over the first Ethernet network.

32. The system of claim 31, wherein the Quality of Service comprises a committed data rate guarantee and a peak data rate guarantee.

33. The system of claim 31, wherein the plurality of servers comprises a first server and a second server and wherein a first level of the Quality of Service provided to the first server is different than a second level of the Quality of Service provided to the second server.

34. The system of claim 31, wherein the Quality of Service is provided for each virtual network interface card of the plurality of virtual network interface cards.

* * * * *

UNITED STATES PATENT AND TRADEMARK OFFICE
CERTIFICATE OF CORRECTION

PATENT NO.       : 9,973,446 B2
APPLICATION NO.  : 12/544744
DATED            : May 15, 2018
INVENTOR(S)      : Cohen et al.

Page 1 of 1

It is certified that error appears in the above-identified patent and that said Letters Patent is hereby corrected as shown below:

In the Specification

In Column 7, Line 9, delete "vNIC 1," and insert -- vNIC_1, --, therefor.

Signed and Sealed this
Sixth Day of November, 2018

Andrei Iancu
*Director of the United States Patent and Trademark Office*